United States Patent
Akiyoshi et al.

(10) Patent No.: US 6,959,040 B2
(45) Date of Patent: Oct. 25, 2005

(54) METHOD AND APPARATUS FOR CODING AND DECODING IMAGE DATA WITH SYNCHRONIZED SOUND DATA

(75) Inventors: Kozo Akiyoshi, Tokyo (JP); Nobuo Akiyoshi, Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 463 days.

(21) Appl. No.: 10/156,015

(22) Filed: May 29, 2002

(65) Prior Publication Data

US 2003/0043910 A1 Mar. 6, 2003

(30) Foreign Application Priority Data

May 31, 2001 (JP) ........................................ 2001-163952

(51) Int. Cl.[7] .............................................. H04B 1/66
(52) U.S. Cl. ............................................... 375/240.01
(58) Field of Search ....................... 375/240.01–240.29; 386/1; 382/232, 236; H04B 1/66; H04N 1/66

(56) References Cited

U.S. PATENT DOCUMENTS

| | | | | |
|---|---|---|---|---|
| 5,497,434 A | * | 3/1996 | Wilson | ........................ 382/232 |
| 5,565,996 A | * | 10/1996 | Ueda | ............................... 386/1 |
| 6,018,592 A | | 1/2000 | Shinagawa et al. | |
| 6,137,910 A | | 10/2000 | Shinagawa et al. | |
| 6,563,874 B1 | * | 5/2003 | Lu | ......................... 375/240.12 |
| 2002/0003904 A1 | * | 1/2002 | Shinagawa et al. | ......... 382/236 |
| 2002/0154699 A1 | * | 10/2002 | Yamaguchi et al. | ... 375/240.25 |

* cited by examiner

*Primary Examiner*—Tung Vo

(57) ABSTRACT

An image processing system including an image coding apparatus and an image decoding apparatus. The image coding apparatus includes an image input unit for acquiring key frames, a matching processor for generating correspondence information between the key frames, a sound input unit for acquiring sound data to be synchronized with the key frames and correspondence information, and a stream generator for generating a coded data stream which includes the sound data, the correspondence information, and the key frames. The image decoding apparatus includes a stream input unit for acquiring the added data stream, a stream separator for separating the key frames, correspondence information and sound data from the coded data stream; an intermediate frame generator for generating intermediate frames from the key frames and correspondence information, and an output controller for outputting the key frames and intermediate frames in synchronization with the sound data.

14 Claims, 18 Drawing Sheets

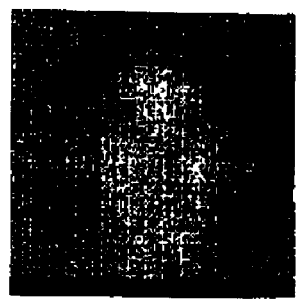
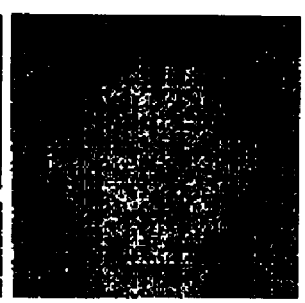
Fig.1a  Fig.1b
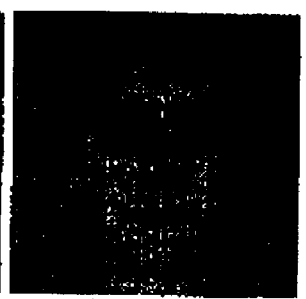
Fig.1c  Fig.1d
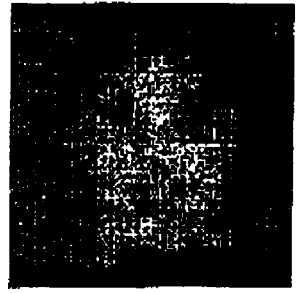
Fig.1e  Fig.1f
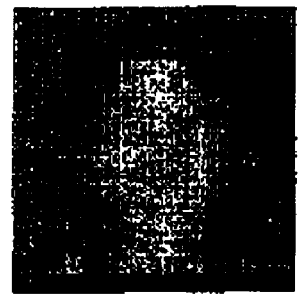
Fig.1g  Fig.1h
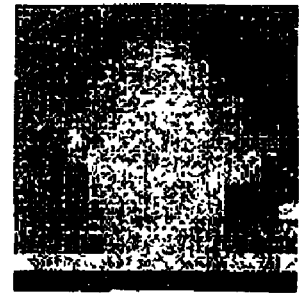
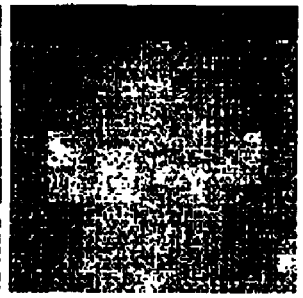
Fig.1i  Fig.1j

Fig. 9

CBS

METHOD AND APPARATUS FOR CODING AND DECODING IMAGE DATA WITH SYNCHRONIZED SOUND DATA

BACKGROUND OF THE INVENTION

1. Field of the Invention

The present invention relates to an image processing technology, and more particularly relates to a method and apparatus for coding and decoding data containing a plurality of frames and including sound data.

2. Description of the Related Art

Recently, image processing and compression methods such as those proposed by MPEG (Motion Picture Expert Group) have expanded to be used with transmission media such as network and broadcast rather than just storage media such as CDs. Generally speaking, the success of the digitization of broadcast materials has been caused at least in part by the availability of MPEG compression coding technology. In this way, a barrier that previously existed between broadcast and other types of communication has begun to disappear, leading to a diversification of service-providing businesses. Thus, we are facing a situation where it is hard to predict how digital culture will evolve in this age of broadband.

Even in such a chaotic situation, it is clear that the direction of the compression technology of motion pictures will be to move to both higher compression rates and better image quality. It is well-known that block distortion in MPEG compression is sometimes responsible for causing degraded image quality and preventing the compression rate from being improved.

SUMMARY OF THE INVENTION

The present invention has been made in view of the foregoing circumstances and an object thereof is to provide coding and decoding techniques for efficient compression of image data, and in particular, motion picture data. It is further noted that the techniques are applicable to motion pictures in a broad sense, including image effects such as morphing and walkthrough. As is described further below, embodiments of the present invention may make use of an image matching technology (hereinafter referred to as the "base technology") which was first proposed in Japanese patent No.2927350, U.S. Pat. Nos. 6,018,592 and 6,137,910, all assigned to the same assignee.

A preferred embodiment according to the present invention relates to an image coding method. This method comprises: acquiring key frames from a motion picture and corresponding point data between the key frames; acquiring sound data which is to be reproduced synchronously with reproduction of the motion picture; and generating a coded data stream comprising the sound data, the corresponding point data, and the key frames. Here, the term "frame" is used as a unit of image or of a motion picture, however, it is not distinguished from "image" unless particularly necessary. The embodiments provide a new type of coding technique for images.

In this method, the corresponding point data may be acquired based on critical points of the key frames, and may be represented by corresponding pixels between the key frames. The method may further comprise generating the corresponding point data based on matching between the key frames.

Another embodiment of the present invention relates to an image coding apparatus. This apparatus comprises: a first function block for acquiring key frames included in a motion picture and corresponding point data between the key frames; a second function block for acquiring sound data to be reproduced synchronously with reproduction of the motion picture; and a third function block for generating a coded data stream comprising the sound data, the corresponding point data and the key frames. It will be understood that the function blocks described above may not necessarily be integrated physically in one unit and that the functions performed may be combined in various ways or units depending on the application.

In a particular case, the first function block may comprise an input unit which acquires the key frames and a matching processor which generates the corresponding point data. Also, the corresponding point data and the sound data may be collectively stored in a correspondence information file.

Further, the matching processor may generate the corresponding point data by multiresolutionizing respective key frames by extracting critical points, specifying a relation between the critical points in sequence starting from a coarse level of resolution, and generating a correspondence information using the specified relation. Further, the matching processor may generate the corresponding point data by computing matching between the key frames using a multiresolutional critical point filter thereon and generating the corresponding point data using the computed matching.

Still another embodiment of the present invention relates to an image decoding method. The method comprises: acquiring a coded data stream comprising key frames, corresponding point data for the key frames and sound data related to the key frames; acquiring or separating the key frames, corresponding point data and sound data from the coded data stream; reproducing a motion picture based on the key frames and the corresponding point data; and outputting the sound data with synchronizing with the motion picture.

In particular, the reproduction of the motion picture may be executed by utilizing the key frames and intermediate frames generated from interpolation of the key frames using the corresponding point data, and the output timing of the sound data may be controlled based on the number of intermediate frames generated. For example, since the number of intermediate frames generated from interpolation can be variable, it may be suitable for the sound data to be extended if many intermediate frames are generated and the interval of the generation of these frames is regular.

Still another embodiment of the present invention relates to an image decoding apparatus. The apparatus comprises: a first function block for acquiring a coded data stream of a motion picture; a second function block for acquiring key frames, corresponding point data between the key frames, and sound data from the coded data stream; a third function block for generating intermediate frames based on the key frames and the corresponding point data; a fourth function block for outputting the key frames and the intermediate frames as a motion picture; and a fifth function block for outputting the sound data synchronously with the motion picture.

In a particular case, the third function block may receive an instruction regarding the number of intermediate frames to be generated from an external source. For example, a user may control the number of intermediate frames or a parameter representing the number by using a suitable input device such as a mouse, a remote controller or the like.

When the corresponding point data and the sound data are stored collectively as a correspondence information file, the second function block may acquire the corresponding point data and the sound data from the correspondence information file.

According to yet another embodiment of the invention, there is provided an image coding method including acquiring key frames from a sequence of image frames, said key frames representing a subset of the sequence of image frames; generating corresponding point data by performing a matching between the key frames; acquiring sound data related to the sequence of image frames; and generating a coded data stream comprising the key frames, corresponding point data and the sound data, wherein the sequence of image frames, with synchronized sound data, can be reproduced from the coded data stream.

As described above, the technique for generating the correspondence information (corresponding point file) may use the image matching technique described below as "base technology" however, this is not a necessary part of the embodiments.

It is to be noted that it is also possible to have replacement or substitution of the above-described structural components and elements of methods in part or whole as between method and apparatus or to add elements to either method or apparatus and also, the apparatuses and methods may be implemented by a computer program and saved on a recording medium or the like and are all effective as and encompassed by the present invention.

Moreover, this summary of the invention includes features that may not be necessary features such that an embodiment of the present invention may also be a sub-combination of these described features.

BRIEF DESCRIPTION OF THE DRAWINGS

FIG. 1(a) is an image obtained as a result of the application of an averaging filter to a human facial image.

FIG. 1(b) is an image obtained as a result of the application of an averaging filter to another human facial image.

FIG. 1(c) is an image of a human face at $p^{(5,0)}$ obtained in a preferred embodiment in the base technology.

FIG. 1(d) is another image of a human face at $p^{(5,0)}$ obtained in a preferred embodiment in the base technology.

FIG. 1(e) is an image of a human face at $p^{(5,1)}$ obtained in a preferred embodiment in the base technology.

FIG. 1(f) is another image of a human face at $p^{(5,1)}$ obtained in a preferred embodiment in the base technology.

FIG. 1(g) is an image of a human face at $p^{(5,2)}$ obtained in a preferred embodiment in the base technology.

FIG. 1(h) is another image of a human face at $p^{(5,2)}$ obtained in a preferred embodiment in the base technology.

FIG. 1(i) is an image of a human face at $p^{(5,3)}$ obtained in a preferred embodiment in the base technology.

FIG. 1(j) is another image of a human face at $p^{(5,3)}$ obtained in a preferred embodiment in the base technology.

FIG. 9 is a diagram showing correspondence between partial images of the m-th and (m−1)th levels of resolution.

DETAILED DESCRIPTION OF THE INVENTION

Figure 2R:
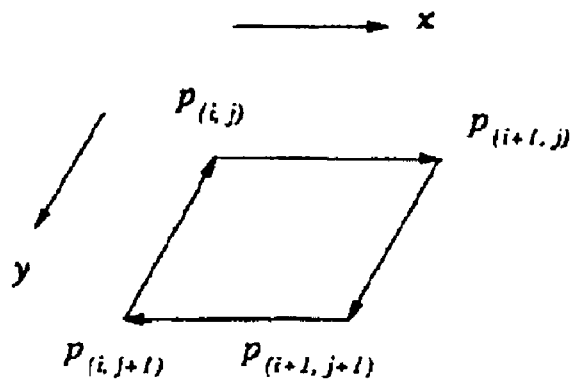
FIG. 2(R) shows an original quadrilateral.
Figure 2A:
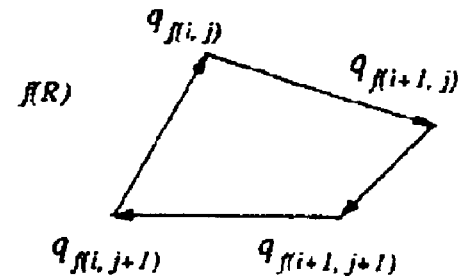
FIG. 2(A) shows an inherited quadrilateral.
Figure 2E:
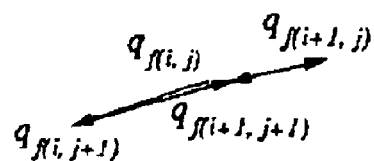
FIG. 2(E) shows an inherited quadrilateral.
Figure 2B:
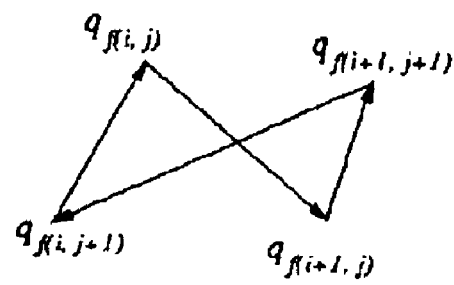
FIG. 2(B) shows an inherited quadrilateral.
Figure 2D:
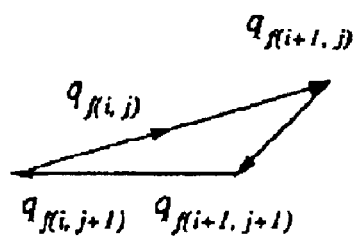
FIG. 2(D) shows an inherited quadrilateral.
Figure 2C:
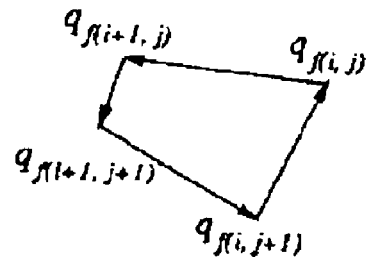
FIG. 2(C) shows an inherited quadrilateral.

The invention will now be described based on the preferred embodiments, which are not intended to limit the scope of, but exemplify, the present invention. All of the features and the combinations thereof described in the embodiments are not necessarily essential to the invention.

First, the multiresolutional critical point filter technology and the image matching processing using the technology, both of which will be utilized in the preferred embodiments, will be described in detail as "Base Technology". Namely, the following sections [1] and [2] (below) belong to the base technology, where section [1] describes elemental techniques and section [2] describes a processing procedure. These techniques are patented under Japanese Patent No. 2927350, and U.S. Pat. Nos. 6,018,592 and 6,137,910, owned by the same assignee of the present invention, the contents of which are hereby incorporated herein by reference. However, it is to be noted that the image matching techniques provided in the present embodiments are not limited to these techniques. In particular, in FIGS. 18 to 22, image processing and data coding and decoding techniques, utilizing, in part, the base technology, will be described in more detail.

Base Technology

[1] Detailed Description of Elemental Techniques

[1.1] Introduction

Using a set of new multiresolutional filters called critical point filters, image matching is accurately computed. There is no need for any prior knowledge concerning the content of the images or objects in question. The matching of the images is computed at each resolution while proceeding through the resolution hierarchy. The resolution hierarchy proceeds from a coarse level to a fine level. Parameters necessary for the computation are set completely automatically by dynamical computation analogous to human visual systems. Thus, There is no need to manually specify the correspondence of points between the images.

The base technology can be applied to, for instance, completely automated morphing, object recognition, stereo photogrammetry, volume rendering, and smooth generation of motion images from a small number of frames. When applied to morphing, given images can be automatically transformed. When applied to volume rendering, intermediate images between cross sections can be accurately reconstructed, even when a distance between cross sections is rather large and the cross sections vary widely in shape.

[1.2] The Hierarchy of the Critical Point Filters

The multiresolutional filters according to the base technology preserve the intensity and location of each critical point included in the images while reducing the resolution. Initially, let the width of an image to be examined be N and the height of the image be M. For simplicity, assume that $N=M=2^n$ where n is a positive integer. An interval $[0, N] \subset R$ is denoted by I. A pixel of the image at position (i, j) is denoted by $p_{(i,j)}$ where $i,j \in I$.

Here, a multiresolutional hierarchy is introduced. Hierarchized image groups are produced by a multiresolutional filter. The multiresolutional filter carries out a two dimensional search on an original image and detects critical points therefrom. The multiresolutional filter then extracts the critical points from the original image to construct another image having a lower resolution. Here, the size of each of the respective images of the m-th level is denoted as $2^m \times 2^m$ ($0 \leq m \leq n$). A critical point filter constructs the following four new hierarchical images recursively, in the direction descending from n.

$$p_{(i,j)}^{(m,0)} = \min(\min(p_{(2i,2j)}^{(m+1,0)}, p_{(2i,2j+1)}^{(m+1,0)}), \min(p_{(2i+1,2j)}^{(m+1,0)}, p_{(2i+1,2j+1)}^{(m+1,0)})) \quad (1)$$

$$p_{(i,j)}^{(m,1)} = \max(\min(p_{(2i,2j)}^{(m+1,1)}, p_{(2i,2j+1)}^{(m+1,1)}), \min(p_{(2i+1,2j)}^{(m+1,1)}, p_{(2i+1,2j+1)}^{(m+1,1)}))$$

$$p_{(i,j)}^{(m,2)} = \min(\max(p_{(2i,2j)}^{(m+1,2)}, p_{(2i,2j+1)}^{(m+1,2)}), \max(p_{(2i+1,2j)}^{(m+1,2)}, p_{(2i+1,2j+1)}^{(m+1,2)}))$$

$$p_{(i,j)}^{(m,3)} = \max(\max(p_{(2i,2j)}^{(m+1,3)}, p_{(2i,2j+1)}^{(m+1,3)}), \max(p_{(2i+1,2j)}^{(m+1,3)}, p_{(2i+1,2j+1)}^{(m+1,3)}))$$

where we let $$p_{(i,j)}^{(n,0)} = p_{(i,j)}^{(n,1)} = p_{(i,j)}^{(n,2)} = p_{(i,j)}^{(n,3)} = p_{(i,j)} \quad (2)$$

The above four images are referred to as subimages hereinafter. When $\min_{x \leq t \leq x+1}$ and $\max_{x \leq t \leq x+1}$ are abbreviated to $\alpha$ and $\beta$, respectively, the subimages can be expressed as follows:

$$p^{(m,0)} = \alpha(x)\alpha(y)p^{(m+1,0)}$$

$$p^{(m,1)} = \alpha(x)\beta(y)p^{(m+1,1)}$$

$$p^{(m,2)} = \beta(x)\alpha(y)p^{(m+1,2)}$$

$$p^{(m,2)} = \beta(x)\beta(y)p^{(m+1,3)}$$

Namely, they can be considered analogous to the tensor products of $\alpha$ and $\beta$. The subimages correspond to the respective critical points. As is apparent from the above equations, the critical point filter detects a critical point of the original image for every block consisting of 2×2 pixels. In this detection, a point having a maximum pixel value and a point having a minimum pixel value are searched with respect to two directions, namely, vertical and horizontal directions, in each block. Although pixel intensity is used as a pixel value in this base technology; various other values relating to the image may be used. A pixel having the maximum pixel values for the two directions, one having minimum pixel values for the two directions, and one having a minimum pixel value for one direction and a maximum pixel value for the other direction are detected as a local maximum point, a local minimum point, and a saddle point, respectively.

By using the critical point filter, an image (1 pixel here) of a critical point detected inside each of the respective blocks serves to represent its block image (4 pixels here) in the next lower resolution level. Thus, the resolution of the image is reduced. From a singularity theoretical point of view, $\alpha(x)\alpha(y)$ preserves the local minimum point (minima point), $\beta(x)\beta(y)$ preserves the local maximum point (maxima point), $\alpha(x)\beta(y)$ and $\beta(x)\alpha(y)$ preserve the saddle points.

At the beginning, a critical point filtering process is applied separately to a source image and a destination image which are to be matching-computed. Thus, a series of image groups, namely, source hierarchical images and destination hierarchical images are generated. Four source hierarchical images and four destination hierarchical images are generated corresponding to the types of the critical points.

Thereafter, the source hierarchical images and the destination hierarchical images are matched in a series of resolution levels. First, the minima points are matched using $p^{(m,0)}$. Next, the first saddle points are matched using $p^{(m,1)}$ based on the previous matching result for the minima points. The second saddle points are matched using $p^{(m,2)}$. Finally, the maxima points are matched using $p^{(m,3)}$.

FIGS. 1c and 1d show the subimages $p^{(5,0)}$ of the images in FIGS. 1a and 1b, respectively. Similarly, FIGS. 1e and 1f show the subimages $p^{(5,1)}$, FIGS. 1g and 1h show the subimages $p^{(5,2)}$, and FIGS. 1i and 1j show the subimages $p^{(5,3)}$. Characteristic parts in the images can be easily matched using subimages. The eyes can be matched by $p^{(5,0)}$ since the eyes are the minima points of pixel intensity in a face. The mouths can be matched by $p^{(5,1)}$ since the mouths have low intensity in the horizontal direction. Vertical lines on both sides of the necks become clear by $p^{(5,2)}$. The ears and bright parts of the cheeks become clear by $p^{(5,3)}$ since these are the maxima points of pixel intensity.

As described above, the characteristics of an image can be extracted by the critical point filter. Thus, by comparing, for example, the characteristics of an image shot by a camera with the characteristics of several objects recorded in advance, an object shot by the camera can be identified.

[1.3] Computation of Mapping Between Images

Now, for matching images, a pixel of the source image at the location (i,j) is denoted by $p_{(i,j)}^{(n)}$ and that of the destination image at (k,l) is denoted by $q_{(k,l)}^{(n)}$ where i, j, k, l ∈ I. The energy of the mapping between the images (described later in more detail) is then defined. This energy is determined by the difference in the intensity of the pixel of the source image and its corresponding pixel of the destination image and the smoothness of the mapping. First, the mapping $f^{(m,0)}:p^{(m,0)} \to q^{(m,0)}$ between $p^{(m,0)}$ and $q^{(m,0)}$ with the minimum energy is computed. Based on $f^{(m,0)}$, the mapping $f^{(m,1)}$ between $p^{(m,1)}$ and $q^{(m,1)}$ with the minimum energy is computed. This process continues until $f^{(m,3)}$ between $p^{(m,3)}$ and $q^{(m,3)}$ is computed. Each $f^{(m,i)}$ (i=0, 1, 2, ...) is referred to as a submapping. The order of i will be rearranged as shown in the following equation (3) in computing $f^{(m,1)}$ for reasons to be described later.

$$f^{(m,1)}:p^{(m,\sigma(i))} \to q^{(m,\sigma(i))} \quad (3)$$

where $\sigma(i) \in \{0, 1, 2, 3\}$.

[1.3.1] Bijectivity

When the matching between a source image and a destination image is expressed by means of a mapping, that mapping shall satisfy the Bijectivity Conditions (BC) between the two images (note that a one-to-one surjective mapping is called a bijection). This is because the respective images should be connected satisfying both surjection and injection, and there is no conceptual supremacy existing between these images. It is to be noted that the mappings to be constructed here are the digital version of the bijection. In the base, technology, a pixel is specified by a co-ordinate point.

The mapping of the source subimage (a subimage of a source image) to the destination subimage (a subimage of a destination image) is represented by $f^{(m,s)}: I/2^{n-m} \times I/2^{n-m} \to I/2^{n-m} \times I/2^{n-m}$ (s=0, 1, ...), where $f_{(i,j)}^{(m,s)}=(k,l)$ means that $p_{(i,j)}^{(m,s)}$ of the source image is mapped to $q_{(k,l)}^{(m,s)}$ of the destination image. For simplicity, when f(i,j)=(k,l) holds, a pixel $q_{(k,l)}$ is denoted by $q_{f(i,j)}$.

When the data sets are discrete as image pixels (grid points) treated in the base technology, the definition of bijectivity is important. Here, the bijection will be defined in the following manner, where i, j, k and l are all integers. First, a square region R defined on the source image plane is considered $$p_{(i,j)}^{(m,s)} p_{(i+1,j)}^{(m,s)} p_{(i+1,j+1)}^{(m,s)} p_{(i,j+1)}^{(m,s)} \quad (4)$$

where i=0, ..., $2^m-1$, and j=0, ..., $2^m-1$. The edges of R are directed as follows:

$$\overrightarrow{p_{(i,j)}^{(m,s)} p_{(i+1,j)}^{(m,s)}}, \overrightarrow{p_{(i+1,j)}^{(m,s)} p_{(i+1,j+1)}^{(m,s)}}, \quad (5)$$

$$\overrightarrow{p_{(i+1,j+1)}^{(m,s)} p_{(i,j+1)}^{(m,s)}} \text{ and } \overrightarrow{p_{(i,j+1)}^{(m,s)} p_{(i,j)}^{(m,s)}}$$

This square region R will be mapped by f to a quadrilateral on the destination image plane:

$$q_{f(i,j)}^{(m,s)} q_{f(i+1,j)}^{(m,s)} q_{f(i+1,j+1)}^{(m,s)} q_{f(i,j+1)}^{(m,s)} \quad (6)$$

This mapping $f^{(m,s)}(R)$, that is, $$f^{(m,s)}(R)=f^{(m,s)}(p_{(i,j)}^{(m,s)} p_{(i+1,j)}^{(m,s)} p_{(i+1,j+1)}^{(m,s)} p_{(i,j+1)}^{(m,s)})= q_{f(i,j)}^{(m,s)} q_{f(i+1,j)}^{(m,s)} q_{f(i+1,j+1)}^{(m,s)} q_{f(i,j+1)}^{(m,s)})$$

should satisfy the following bijectivity conditions (referred to as BC hereinafter):

1. The edges of the quadrilateral $f^{(m,s)}(R)$ should not intersect one another.
2. The orientation of the edges of $f^{(m,s)}(R)$ should be the same as that of R (clockwise in the case shown in FIG. 2, described below).
3. As a relaxed condition, a retraction mapping is allowed.

Without a certain type of a relaxed condition as in, for example, condition 3 above, there would be no mappings which completely satisfy the BC other than a trivial identity mapping. Here, the length of a single edge of $f^{(m,s)}(R)$ may be zero. Namely, $f^{(m,s)}(R)$ may be a triangle. However, $f^{(m,s)}(R)$ is not allowed to be a point or a line segment having area zero. Specifically speaking, if FIG. 2R is the original quadrilateral, FIGS. 2A and 2D satisfy the BC while FIGS. 2B, 2C and 2E do not satisfy the BC.

In actual implementation, the following condition may be further imposed to easily guarantee that the mapping is surjective. Namely, each pixel on the boundary of the source image is mapped to the pixel that occupies the same location at the destination image. In other words, f(i,j)=(i,j) (on the four lines of i=0, i=$2^m-1$, j=0, j=$2^m-1$). This condition will be hereinafter referred to as an additional condition.

[1.3.2] Energy of Mapping

[1.3.2.1] Cost Related to the Pixel Intensity

The energy of the mapping f is defined. An objective here is to search a mapping whose energy becomes minimum. The energy is determined mainly by the difference in the intensity between the pixel of the source image and its corresponding pixel of the destination image. Namely, the energy $C_{(i,j)}^{(m,s)}$ of the mapping $f^{(m,s)}$ at (i,j) is determined by the following equation (7).

$$C_{(i,j)}^{(m,s)}=|V(p_{(i,j)}^{(m,s)})-V(q_{f(i,j)}^{(m,s)})|^2 \quad (7)$$

where $V(p_{(i,j)}^{(m,s)})$ and $V(q_{f(i,j)}^{(m,s)})$ are the intensity values of the pixels $p_{(i,j)}^{(m,s)}$ and $q_{f(i,j)}^{(m,s)}$, respectively. The total energy $C^{(m,s)}$ of f is a matching evaluation equation, and can be defined as the sum of $C_{(i,j)}^{(m,s)}$ as shown in the following equation (8).

$$C_f^{(m,s)} = \sum_{i=0}^{i=2^m-1} \sum_{j=0}^{j=2^m-1} C_{(i,j)}^{(m,s)} \quad (8)$$

[1.3.2.2] Cost Related to the Locations of the Pixel for Smooth Mapping

In order to obtain smooth mappings, another energy $D_f$ for the mapping is introduced. The energy $D_f$ is determined by the locations of $p_{(i,j)}^{(m,s)}$ and $q_{f(i,j)}^{(m,s)}$ (i=0, 1, ..., $2^m-1$, j=0, 1, ..., $2^m-1$), regardless of the intensity of the pixels. The energy $D_{(i,j)}^{(m,s)}$ of the mapping $f^{(m,s)}$ at a point (i,j) is determined by the following equation (9).

$$D_{(i,j)}^{(m,s)}=\eta E_{0(i,j)}^{(m,s)}+E_{1(i,j)}^{(m,s)} \quad (9)$$

where the coefficient parameter η which is equal to or greater than 0 is a real number. And we have $$E_{0(i,j)}^{(m,s)}=\|(i,j)-f^{(m,s)}(i,j)\|^2 \quad (10)$$

$$E_{1(i,j)}^{(m,s)} = \quad (11)$$

$$\sum_{i'=i-1}^{i} \sum_{j'=j-1}^{j} \|(f^{(m,s)}(i,j)-(i,j))-(f^{(m,s)}(i',j')-(i',j'))\|^2/4$$

where $$\|(x,y)\|=\sqrt{x^2+y^2} \quad (12),$$

i' and j' are integers and f(i',j') is defined to be zero for i'<0 and j'<0. $E_0$ is determined by the distance between (i,j) and f(i,j). $E_0$ prevents a pixel from being mapped to a pixel too far away from it. However, as explained below, $E_0$ can be replaced by another energy function. $E_1$ ensures the smoothness of the mapping. $E_1$ represents a distance between the displacement of p(i,j) and the displacement of its neighboring points. Based on the above consideration, another evaluation equation for evaluating the matching, or the energy $D_f$ is determined by the following equation:

$$D_f^{(m,s)} = \sum_{i=0}^{i=2^m-1} \sum_{j=0}^{j=2^m-1} D_{(i,j)}^{(m,s)} \quad (13)$$

[1.3.2.3] Total Energy of the Mapping

The total energy of the mapping, that is, a combined evaluation equation which relates to the combination of a plurality of evaluations, is defined as $\lambda C_f^{(m,s)} + D_f^{(m,s)}$, where $\lambda \geq 0$ is a real number. The goal is to detect a state in which the combined evaluation equation has an extreme value, namely, to find a mapping which gives the minimum energy expressed by the following:

$$\min_f \{\lambda C_f^{(m,s)} + D_f^{(m,s)}\} \quad (14)$$

Care must be exercised in that the mapping becomes an identity mapping if $\lambda=0$ and $\eta=0$ (i.e., $f^{(m,s)}(i,j)=(i,j)$ for all $i=0, 1, \ldots, 2^m-1$ and $j=0, 1, \ldots, 2^m-1$). As will be described later, the mapping can be gradually modified or transformed from an identity mapping since the case of $\lambda=0$ and $\eta=0$ is evaluated at the outset in the base technology. If the combined evaluation equation is defined as $C_f^{(m,s)} + \lambda D_f^{(m,s)}$ where the original position of $\lambda$ is changed as such, the equation with $\lambda=0$ and $\eta=0$ will be $C_f^{(m,s)}$ only. As a result thereof, pixels would randomly matched to each other only because their pixel intensities are close, thus making the mapping totally meaningless. Transforming the mapping based on such a meaningless mapping makes no sense. Thus, the coefficient parameter is so determined that the identity mapping is initially selected for the evaluation as the best mapping.

Similar to this base technology, differences in the pixel intensity and smoothness are considered in a technique called "optical flow" that is known in the art. However, the optical flow technique cannot be used for image transformation since the optical flow technique takes into account only the local movement of an object. However, global correspondence can also be detected by utilizing the critical point filter according to the base technology.

[1.3.3] Determining the Mapping with Multiresolution

A mapping $f_{min}$ which gives the minimum energy and satisfies the BC is searched by using the multiresolution hierarchy. The mapping between the source subimage and the destination subimage at each level of the resolution is computed. Starting from the top of the resolution hierarchy (i.e., the coarsest level), the mapping is determined at each resolution level, and where possible, mappings at other levels are considered. The number of candidate mappings at each level is restricted by using the mappings at an upper (i.e., coarser) level of the hierarchy. More specifically speaking, in the course of determining a mapping at a certain level, the mapping obtained at the coarser level by one is imposed as a sort of constraint condition.

We thus define a parent and child relationship between resolution levels. When the following equation (15) holds, $$(i', j') = \left(\left\lfloor \frac{i}{2} \right\rfloor, \left\lfloor \frac{j}{2} \right\rfloor\right), \quad (15)$$

where $\lfloor x \rfloor$ denotes the largest integer not exceeding x, $p_{(i',j')}^{(m-1,s)}$ and $q_{(i',j')}^{(m-1,s)}$ are respectively called the parents of $p_{(i,j)}^{(m,s)}$ and $q_{(i,j)}^{(m,s)}$. Conversely, $p_{(i,j)}^{(m,s)}$ and $q_{(i,j)}^{(m,s)}$ are the child of $p_{(i',j')}^{(m-1,s)}$ and the child of $q_{(i',j')}^{(m-1,s)}$, respectively. A function parent(i,j) is defined by the following equation (16):

$$\text{parent}(i,j) = \left(\left\lfloor \frac{i}{2} \right\rfloor, \left\lfloor \frac{j}{2} \right\rfloor\right) \quad (16)$$

Now, a mapping between $p_{(i,j)}^{(m,s)}$ and $q_{(k,l)}^{(m,s)}$ is determined by computing the energy and finding the minimum thereof. The value of $f^{(m,s)}(i,j)=(k,l)$ is determined as follows using f(m−1,s) (m=1, 2, ..., n). First of all, a condition is imposed that $q_{(k,l)}^{(m,s)}$ should lie inside a quadrilateral defined by the following definitions (17) and (18). Then, the applicable mappings are narrowed down by selecting ones that are thought to be reasonable or natural among them satisfying the BC.

$$q_{g^{(m,s)}(i-1,j-1)}^{(m,s)} q_{g^{(m,s)}(i-1,j+1)}^{(m,s)} \\ q_{g^{(m,s)}(i+1,j+1)}^{(m,s)} q_{g^{(m,s)}(i+1,j-1)}^{(m,s)} \quad (17)$$

where $$g^{(m,s)}(i,j) = f^{(m-1,s)}(\text{parent}(i,j)) + f^{(m-1,s)}(\text{parent}(i,j)+(1,1)) \quad (18)$$

The quadrilateral defined above is hereinafter referred to as the inherited quadrilateral of $p_{(i,j)}^{(m,s)}$. The pixel minimizing the energy is sought and obtained inside the inherited quadrilateral.

Figure 3:
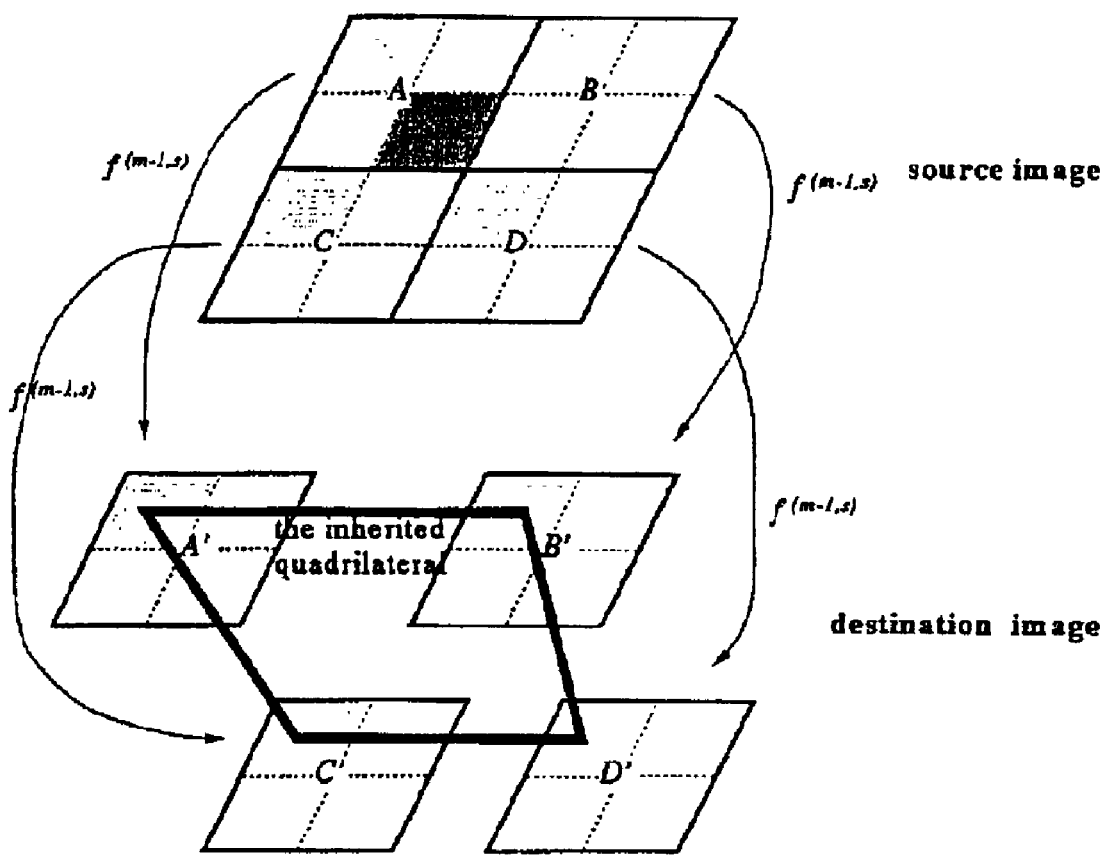
FIG. 3 is a diagram showing the relationship between a source image and a destination image and that between the m-th level and the (m−1)th level, using a quadrilateral.

FIG. 3 illustrates the above-described procedures. The pixels A, B, C and D of the source image are mapped to A', B', C' and D' of the destination image, respectively, at the (m−1)th level in the hierarchy. The pixel $p_{(i,j)}^{(m,s)}$ should be mapped to the pixel $q_{f^{(m)}(i,j)}^{(m,s)}$ which exists inside the inherited quadrilateral A'B'C'D'. Thereby, bridging from the mapping at the (m−1)th level to the mapping at the m-th level is achieved.

The energy $E_0$ defined above may now be replaced by the following equations (19) and (20):

$$E_{0(i,j)} = \|f^{(m,0)}(i,j) - g^{(m)}(i,j)\|^2 \quad (19)$$

$$E_{0(i,j)} = \|f^{(m,s)}(i,j) - f^{(m,s-1)}(i,j)\|^2, (1 \leq i) \quad (20)$$

for computing the submapping $f^{(m,0)}$ and the submapping $f^{(m,s)}$ at the m-th level, respectively.

In this manner, a mapping which maintains a low energy of all the submappings is obtained. Using the equation (20) makes the submappings corresponding to the different critical points associated to each other within the same level in order that the subimages can have high similarity. The equation (19) represents the distance between $f^{(m,s)}(i,j)$ and the location where (i,j) should be mapped when regarded as a part of a pixel at the (m−1)the level.

When there is no pixel satisfying the BC inside the inherited quadrilateral A'B'C'D', the following steps are taken. First, pixels whose distance from the boundary of A'B'C'D' is L (at first, L=1) are examined. If a pixel whose energy is the minimum among them satisfies the BC, then this pixel will be selected as a value of $f^{(m,s)}(i,j)$. L is increased until such a pixel is found or L reaches its upper bound $L_{max}^{(m)}$. $L_{max}^{(m)}$ is fixed for each level m. If no pixel is found at all, the third condition of the BC is ignored temporarily and such mappings that caused the area of the transformed quadrilateral to become zero (a point or a line) will be permitted so as to determine $f^{(m,s)}(i,j)$. If such a pixel is still not found, then the first and the second conditions of the BC will be removed.

Multiresolution approximation is essential to determining the global correspondence of the images while preventing the mapping from being affected by small details of the images. Without the multiresolution approximation, it is impossible to detect a correspondence between pixels whose distances are large. In the case where the multiresolution approximation is not available, the size of an image will generally be limited to a very small size, and only tiny changes in the images can be handled. Moreover, imposing smoothness on the mapping usually makes it difficult to find the correspondence of such pixels. That is because the energy of the mapping from one pixel to another pixel which is far therefrom is high. On the other hand, the multiresolution approximation enables finding the approximate correspondence of such pixels. This is because the distance between the pixels is small at the upper (coarser) level of the hierarchy of the resolution.

[1.4] Automatic Determination of the Optimal Parameter Values

One of the main deficiencies of the existing image matching techniques lies in the difficulty of parameter adjustment. In most cases, the parameter adjustment is performed manually and it is extremely difficult to select the optimal value. However, according to the base technology, the optimal parameter values can be obtained completely automatically.

The systems according to this base technology include two parameters, namely, $\lambda$ and $\eta$, where $\lambda$ and $\eta$ represent the weight of the difference of the pixel intensity and the stiffness of the mapping, respectively. In order to automatically determine these parameters, the are initially set to 0. First, $\lambda$ is gradually increased from $\lambda=0$ while $\eta$ is fixed at 0. As $\lambda$ becomes larger and the value of the combined evaluation equation (equation (14)) is minimized, the value of $C_f^{(m,s)}$ for each submapping generally becomes smaller. This basically means that the two images are matched better. However, if $\lambda$ exceeds the optimal value, the following phenomena occur:

1. Pixels which should not be corresponded are erroneously corresponded only because their intensities are close.
2. As a result, correspondence between images becomes inaccurate, and the mapping becomes invalid.
3. As a result, $D_f^{(m,s)}$ in equation (14) tends to increase abruptly.
4. As a result, since the value of equation (14) tends to increase abruptly, $f^{(m,s)}$ changes in order to suppress the abrupt increase of $D_f^{(m,s)}$. As a result, $C_f^{(m,s)}$ increases.

Therefore, a threshold value at which $C_f^{(m,s)}$ turns to an increase from a decrease is detected while a state in which equation (14) takes the minimum value with $\lambda$ being increased is kept. Such $\lambda$ is determined as the optimal value at $\eta=0$. Next, the behavior of $C_f^{(m,s)}$ is examined while $\eta$ is increased gradually, and $\eta$ will be automatically determined by a method described later. $\lambda$ will then again be determined corresponding to such an automatically determined $\eta$.

The above-described method resembles the focusing mechanism of human visual systems. In the human visual systems, the images of the respective right eye and left eye are matched while moving one eye. When the objects are clearly recognized, the moving eye is fixed.

[1.4.1] Dynamic Determination of $\lambda$

Initially, $\lambda$ is increased from 0 at a certain interval, and a subimage is evaluated each time the value of $\lambda$ changes. As shown in equation (14), the total energy is defined by $\lambda C_f^{(m,s)}+D_f^{(m,s)}$. $D_{(i,j)}^{(m,s)}$ in equation (9) represents the smoothness and theoretically becomes minimum when it is the identity mapping. $E_0$ and $E_1$ increase as the mapping is further distorted. Since $E_1$ is an integer, 1 is the smallest step of $D_f^{(m,s)}$. Thus, it is impossible to change the mapping to reduce the total energy unless a changed amount (reduction amount) of the current $\lambda C_{(i,j)}^{(m,s)}$ is equal to or greater than 1. Since $D_f^{(m,s)}$ increases by more than 1 accompanied by the change of the mapping, the total energy is not reduced unless $\lambda C_{(i,j)}^{(m,s)}$ is reduced by more than 1.

Under this condition, it is shown that $C_{(i,j)}^{(m,s)}$ decreases in normal cases as $\lambda$ increases. The histogram of $C_{(i,j)}^{(m,s)}$ is denoted as $h(l)$, where $h(l)$ is the number of pixels whose energy $C_{(i,j)}^{(m,s)}$ is $l^2$. In order that $\lambda l^2 \geq 1$ for example, the case of $l^2=1/\lambda$ is considered. When $\lambda$ varies from $\lambda_1$ to $\lambda_2$, a number of pixels (denoted A) expressed by the following equation (21):

$$A = \sum_{l=\left|\frac{1}{\lambda_2}\right|}^{\left|\frac{1}{\lambda_1}\right|} h(l) \cong \int_{l=\frac{1}{\lambda_2}}^{\frac{1}{\lambda_1}} h(l) dl = -\int_{\lambda_2}^{\lambda_1} h(l) \frac{1}{\lambda^{3/2}} d\lambda = \int_{\lambda_1}^{\lambda_2} \frac{h(l)}{\lambda^{3/2}} d\lambda \quad (21)$$

changes to a more stable state having the energy shown in equation (22):

$$C_f^{(m,s)} - l^2 = C_f^{(m,s)} - \frac{1}{\lambda}. \quad (22)$$

Here, it is assumed that the energy of these pixels is approximated to be zero. This means that the value of $C_{(i,j)}^{(m,s)}$ changes by:

$$\partial C_f^{(m,s)} = -\frac{A}{\lambda} \quad (23)$$

As a result, equation (24) holds.

$$\frac{\partial C_f^{(m,s)}}{\partial \lambda} = -\frac{h(l)}{\lambda^{5/2}} \quad (24)$$

Since $h(l)>0$, $C_f^{(m,s)}$ decreases in the normal case. However, when $\lambda$ exceeds the optimal value, the above phenomenon, that is, an increase in $C_f^{(m,s)}$ occurs. The optimal value of $\lambda$ is determined by detecting this phenomenon.

When $$h(l) = Hl^k = \frac{H}{\lambda^{k/2}} \quad (25)$$

is assumed, where both $H(H>0)$ and $k$ are constants, the equation (26) holds:

$$\frac{\partial C_f^{(m,s)}}{\partial \lambda} = -\frac{H}{\lambda^{5/2+k/2}} \quad (26)$$

Then, if $k \neq -3$, the following equation (27) holds:

$$C_f^{(m,s)} = C + \frac{H}{(3/2 + k/2)\lambda^{3/2+k/2}} \quad (27)$$

The equation (27) is a general equation of $C_f^{(m,s)}$ (where C is a constant).

When detecting the optimal value of $\lambda$, the number of pixels violating the BC may be examined for safety. In the course of determining a mapping for each pixel, the probability of violating the BC is assumed as a value $p_0$ here. In this case, since $$\frac{\partial A}{\partial \lambda} = \frac{h(l)}{\lambda^{3/2}} \quad (28)$$

holds, the number of pixels violating the BC increases at a rate of:

$$B_0 = \frac{h(l)p_0}{\lambda^{3/2}} \quad (29)$$

Thus, $$\frac{B_0 \lambda^{3/2}}{p_0 h(l)} = 1 \quad (30)$$

is a constant. If it is assumed that $h(l)=Hl^k$, the following equation (31), for example, $$B_0 \lambda^{3/2+k/2} = p_0 H \quad (31)$$

becomes a constant. However, when $\lambda$ exceeds the optimal value, the above value of equation (31) increases abruptly. By detecting this phenomenon, i.e. whether or not the value of $B_0 \lambda^{3/2+k/2}/2^m$ exceeds an abnormal value $B_{0thres}$, the optimal value of $\lambda$ can be determined. Similarly, whether or not the value of $B_1 \lambda^{3/2+k/2}/2^m$ exceeds an abnormal value $B_{1thres}$ can be used to check for an increasing rate $B_1$ of pixels violating the third condition of the BC. The reason why the factor $2^m$ is introduced here will be described at a later stage. This system is not sensitive to the two threshold values $B_{0thres}$ and $B_{1thres}$. The two threshold values $B_{0thres}$ and $B_{1thres}$ can be used to detect excessive distortion of the mapping which may not be detected through observation of the energy $C_f^{(m,s)}$.

In the experimentation, when $\lambda$ exceeded 0.1 the computation of $f^{(m,s)}$ was stopped and the computation of $f^{(m,s+1)}$ was started. That is because the computation of submappings is affected by a difference of only 3 out of 255 levels in pixel intensity when $\lambda > 0.1$ and it is then difficult to obtain a correct result.

[1.4.2] Histogram $h(l)$

The examination of $C_f^{(m,s)}$ does not depend on the histogram $h(l)$, however, the examination of the BC and its third condition may be affected by $h(l)$. When $(\lambda, C_f^{(m,s)})$ is actually plotted, k is usually close to 1. In the experiment, k=1 is used, that is, $B_0 \lambda^2$ and $B_1 \lambda^2$ are examined. If the true value of k is less than 1, $B_0 \lambda^2$ and $B_1 \lambda^2$ are not constants and increase gradually by a factor of $\lambda^{(1-k)/2}$. If $h(l)$ is a constant, the factor is, for example, $\lambda^{1/2}$. However, such a difference can be absorbed by setting the threshold $B_{0thres}$ appropriately.

Let us model the source image by a circular object, with its center at $(x_0, y_0)$ and its radius r, given by:

$$p(i, j) = \quad (32)$$
$$\begin{cases} \frac{255}{r}c\left(\sqrt{(i-x_0)^2+(j-y_0)^2}\right) & \ldots \left(\sqrt{(i-x_0)^2+(j-y_0)^2} \leq r\right) \\ 0 & \ldots \text{(otherwise)} \end{cases}$$

and the destination image given by:

$$q(i, j) = \quad (33)$$
$$\begin{cases} \frac{255}{r}c\left(\sqrt{(i-x_1)^2+(j-y_1)^2}\right) & \ldots \left(\sqrt{(i-x_1)^2+(j-y_1)^2} \leq r\right) \\ 0 & \ldots \text{(otherwise)} \end{cases}$$

with its center at $(x_1, y_1)$ and radius r. In the above, let $c(x)$ have the form of $c(x)=x^k$. When the centers $(x_0, y_0)$ and $(x_1, y_1)$ are sufficiently far from each other, the histogram $h(l)$ is then in the form:

$$h(l) \propto rl^k (k \neq 0) \quad (34)$$

When k=1, the images represent objects with clear boundaries embedded in the background. These objects become darker toward their centers and brighter toward their boundaries. When k=-1, the images represent objects with vague boundaries. These objects are brightest at their centers, and become darker toward their boundaries. Without much loss of generality, it suffices to state that objects in images are generally between these two types of objects. Thus, choosing k such that $-1 \leq k \leq 1$ can cover most cases and the equation (27) is generally a decreasing function for this range.

As can be observed from the above equation (34), attention must be directed to the fact that r is influenced by the resolution of the image, that is, r is proportional to $2^m$. This is the reason for the factor $2^m$ being introduced in the above section [1.4.1].

[1.4.3] Dynamic Determination of $\eta$

The parameter $\eta$ can also be automatically determined in a similar manner. Initially, $\eta$ is set to zero, and the final mapping $f^{(n)}$ and the energy $C_f^{(n)}$ at the finest resolution are computed. Then, after $\eta$ is increased by a certain value $\Delta\eta$, the final mapping $f^{(n)}$ and the energy $C_f^{(n)}$ at the finest resolution are again computed. This process is repeated until the optimal value of $\eta$ is obtained. $\eta$ represents the stiffness of the mapping because it is a weight of the following equation (35):

$$E_{0(i,j)}^{(m,s)} = \|f^{(m,s)}(i,j) - f^{(m,s-1)}(i,j)\|^2 \quad (35)$$

Figure 4:
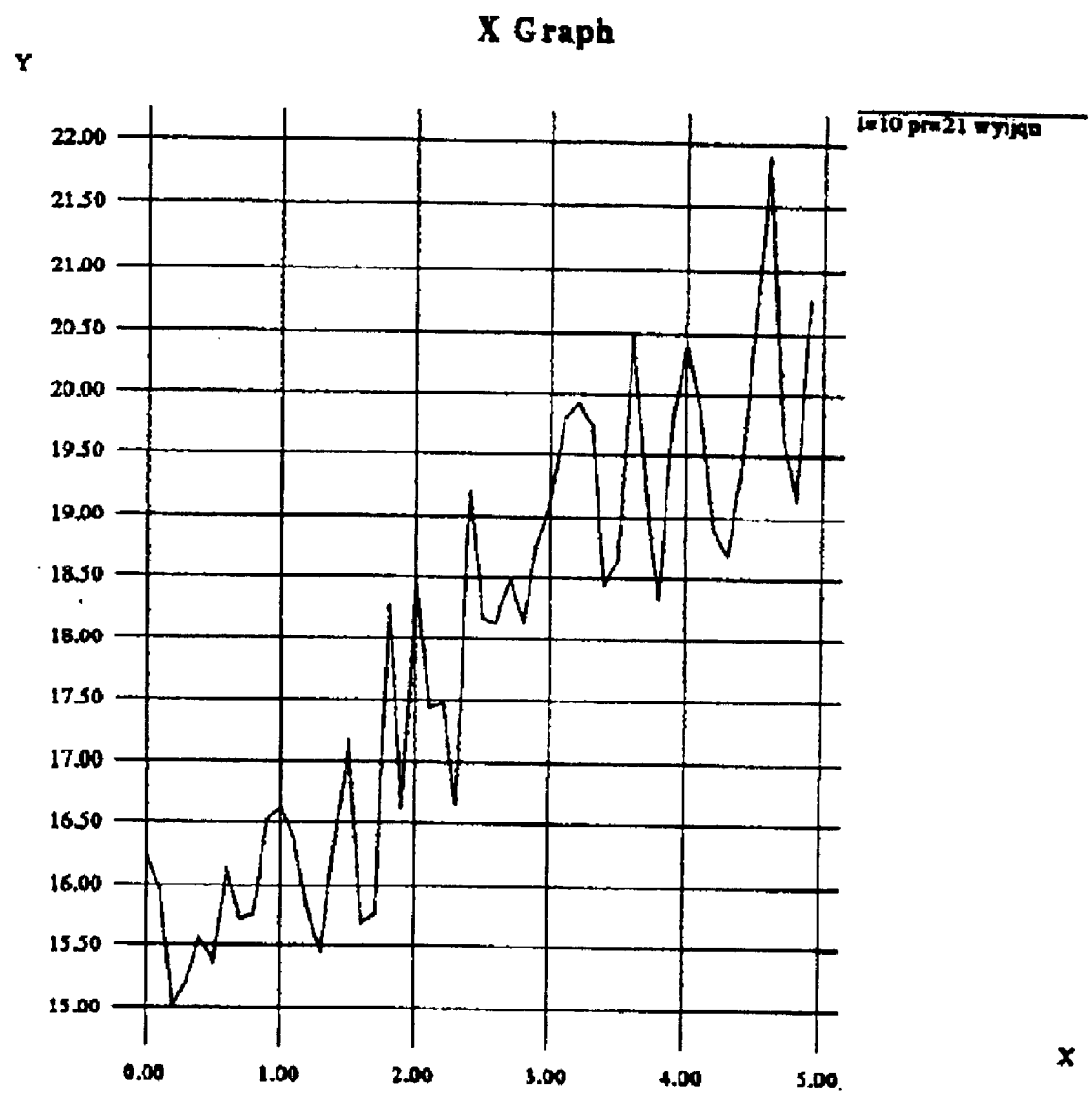
FIG. 4 shows the relationship between a parameter η (represented by x-axis) and energy $C_f$ (represented by y-axis).

If $\eta$ is zero, $D_f^{(n)}$ is determined irrespective of the previous submapping, and the present submapping may be elastically deformed and become too distorted. On the other hand, if $\eta$ is a very large value, $D_f^{(n)}$ is almost completely determined by the immediately previous submapping. The submappings are then very stiff, and the pixels are mapped to almost the same locations. The resulting mapping is therefore the identity mapping. When the value of $\eta$ increases from 0, $C_f^{(n)}$ gradually decreases as will be described later. However, when the value of $\eta$ exceeds the optimal value, the energy starts increasing as shown in FIG. 4. In FIG. 4, the x-axis represents $\eta$, and y-axis represents $C_f$.

The optimum value of $\eta$ which minimizes $C_f^{(n)}$ can be obtained in this manner. However, since various elements affect this computation as compared to the case of $\lambda$, $C_f^{(n)}$ changes while slightly fluctuating. This difference is caused because a submapping is re-computed once in the case of $\lambda$ whenever an input changes slightly, whereas all the submappings must be re-computed in the case of $\eta$. Thus, whether the obtained value of $C_f^{(n)}$ is the minimum or not cannot be determined as easily. When candidates for the minimum value are found, the true minimum needs to be searched by setting up further finer intervals.

[1.5] Supersampling

When deciding the correspondence between the pixels, the range of $f^{(m,s)}$ can be expanded to R×R (R being the set of real numbers) in order to increase the degree of freedom. In this case, the intensity of the pixels of the destination image is interpolated, to provide $f^{(m,s)}$ having an intensity at non-integer points:

$$V(q_{f^{(m,s)}(i,j)}^{(m,s)}) \qquad (36)$$

That is, supersampling is performed. In an example implementation, $f^{(m,s)}$ may take integer and half integer values, and $$V(q_{(i,j)+(0.5,0.5)}^{(m,s)}) \qquad (37)$$

is given by $$(V(q_{(i,j)}^{(m,s)})+V(q_{(i,j)+(1,1)}^{(m,s)}))/2 \qquad (38)$$

[1.6] Normalization of the Pixel Intensity of Each Image

When the source and destination images contain quite different objects, the raw pixel intensity may not be used to compute the mapping because a large difference in the pixel intensity causes excessively large energy $C_f^{(m,s)}$ and thus making it difficult to obtain an accurate evaluation.

For example, a matching between a human face and a cat's face is computed as shown in FIGS. 20(a) and 20(b). The cat's face is covered with hair and is a mixture of very bright pixels and very dark pixels. In this case, in order to compute the submappings of the two faces, subimages are normalized. That is, the darkest pixel intensity is set to 0 while the brightest pixel intensity is set to 255, and other pixel intensity values are obtained using linear interpolation.

[1.7] Implementation

In an example implementation, a heuristic method is utilized wherein the computation proceeds linearly as the source image is scanned. First, the value of $f^{(m,s)}$ is determined at the top leftmost pixel (i,j)=(0,0). The value of each $f^{(m,s)}(i,j)$ is then determined while i is increased by one at each step. When i reaches the width of the image, j is increased by one and i is reset to zero. Thereafter, $f^{(m,s)}(i,j)$ is determined while scanning the source image. Once pixel correspondence is determined for all the points, it means that a single mapping $f^{(m,s)}$ is determined.

When a corresponding point $q_{f(i,j)}$ is determined for $p_{(i,j)}$, a corresponding point $q_{f(i,j+1)}$ of $p_{(i,j+1)}$ is determined next. The position of $q_{f(i,j+1)}$ is constrained by the position of $q_{f(i,j)}$ since the position of $q_{f(i,j+1)}$ satisfies the BC. Thus, in this system, a point whose corresponding point is determined earlier is given higher priority. If the situation continues in which (0,0) is always given the highest priority, the final mapping might be unnecessarily biased. In order to avoid this bias, $f^{(m,s)}$ is determined in the following manner in the base technology.

First, when (s mod 4) is 0, $f^{(m,s)}$ is determined starting from (0,0) while gradually increasing both i and j. When (s mod 4) is 1, $f^{(m,s)}$ is determined starting from the top rightmost location while decreasing i and increasing j. When (s mod 4) is 2, $f^{(m,s)}$ is determined starting from the bottom rightmost location while decreasing both i and j. When (s mod 4) is 3, $f^{(m,s)}$ is determined starting from the bottom leftmost location while increasing i and decreasing j. Since a concept such as the submapping, that is, a parameter s, does not exist in the finest n-th level, $f^{(m,s)}$ is computed continuously in two directions on the assumption that s=0 and s=2.

In this implementation, the values of $f^{(m,s)}(i,j)$ (m=0, ..., n) that satisfy the BC are chosen as much as possible from the candidates (k,l) by imposing a penalty on the candidates violating the BC. The energy $D_{(k,l)}$ of a candidate that violates the third condition of the BC is multiplied by $\phi$ and that of a candidate that violates the first or second condition of the BC is multiplied by $\psi$. In this implementation, $\phi=2$ and $\psi=100000$ are used.

In order to check the above-mentioned BC, the following test may be performed as the procedure when determining $(k,l)=f^{(m,s)}(i\ j)$. Namely, for each grid point (k,l) in the inherited quadrilateral of $f^{(m,s)}(i,j)$, whether or not the z-component of the outer product of $$W = \vec{A} \times \vec{B} \qquad (39)$$

is equal to or greater than 0 is examined, where $$\vec{A} = \overrightarrow{q_{f^{(m,s)}(i,j-1)}^{(m,s)} q_{f^{(m,s)}(i+1,j-1)}^{(m,s)}} \qquad (40)$$

$$\vec{B} = \overrightarrow{q_{f^{(m,s)}(i,j-1)}^{(m,s)} q_{(k,l)}^{(m,s)}} \qquad (41)$$

Here, the vectors are regarded as 3D vectors and the z-axis is defined in the orthogonal right-hand coordinate system. When W is negative, the candidate is imposed with a penalty by multiplying $D_{(k,l)}^{(m,s)}$ by $\psi$ so that it is not as likely to be selected.

Figure 5A:
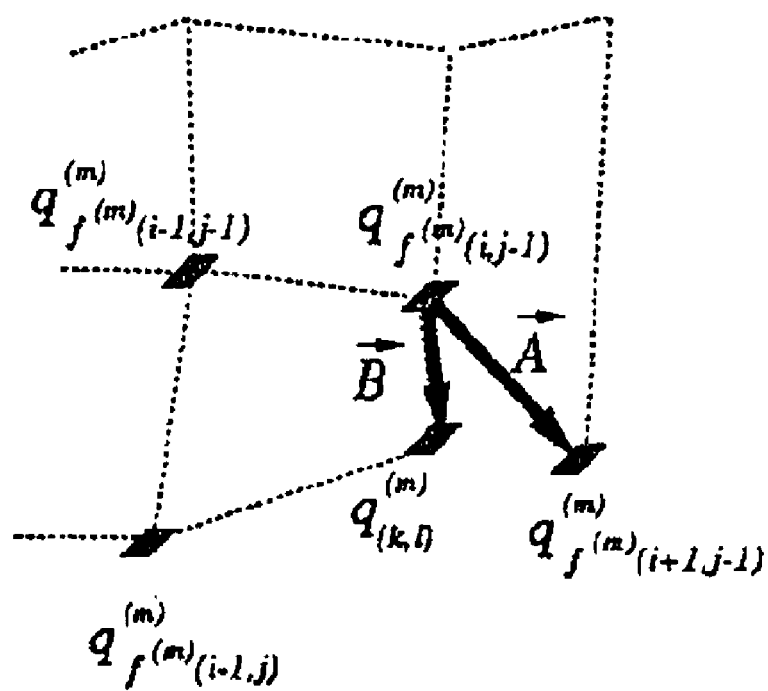
FIG. 5(a) is a diagram illustrating determination of whether or not the mapping for a certain point satisfies the bijectivity condition through the outer product computation.
Figure 5B:
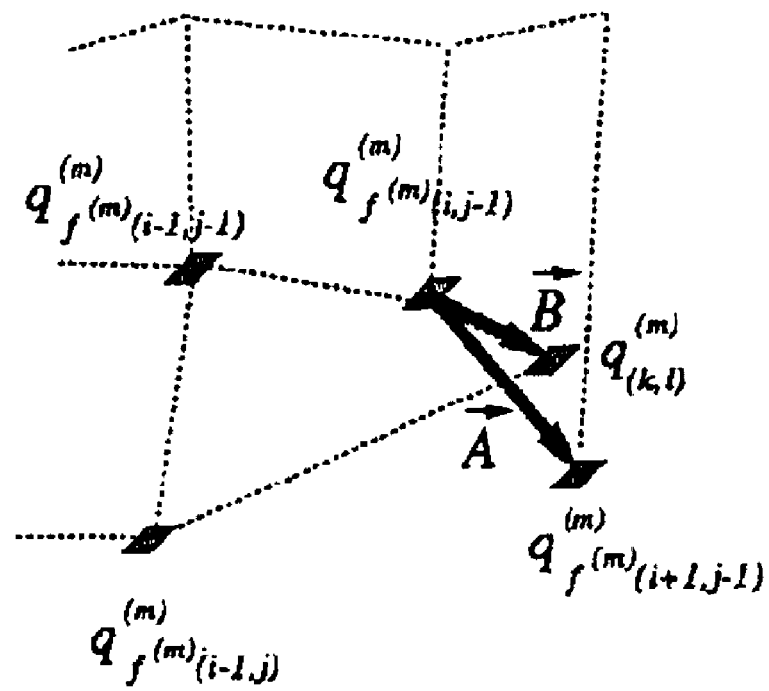
FIG. 5(b) is a diagram illustrating determination of whether or not the mapping for a certain point satisfies the bijectivity condition through the outer product computation.

FIGS. 5(a) and 5(b) illustrate the reason why this condition is inspected. FIG. 5(a) shows a candidate without a penalty and FIG. 5(b) shows one with a penalty. When determining the mapping $f^{(m,s)}(i,j+1)$ for the adjacent pixel at (i,j+1), there is no pixel on the source image plane that satisfies the BC if the z-component of W is negative because then $q_{(k,l)}^{(m,s)}$ passes the boundary of the adjacent quadrilateral.

[1.7.1] The Order of Submappings

In this implementation, $\sigma(0)=0$, $\sigma(1)=1$, $\sigma(2)=2$, $\sigma(3)=3$, $\sigma(4)=0$ are used when the resolution level is even, while $\sigma(0)=3$, $\sigma(1)=2$, $\sigma(2)=1$, $\sigma(3)=0$, $\sigma(4)=3$ are used when the resolution level is odd. Thus, the submappings are shuffled to some extent. It is to be noted that the submappings are primarily of four types, and s may be any of 0 to 3. However, a processing with s=4 is used in this implementation for a reason to be described later.

[1.8] Interpolations

After the mapping between the source and destination images is determined, the intensity values of the corresponding pixels are interpolated. In the implementation, trilinear interpolation is used. Suppose that a square $p_{(i,j)}p_{(i+1,j)}p_{(i+1,j+1)}p_{(i,j+1)}$ on the source image plane is mapped to a quadrilateral $q_{f(i,j)}q_{f(i+1,j)}q_{f(i+1,j+1)}q_{f(i,j+1)}$ on the destination image plane. For simplicity, the distance between the image planes is assumed to be 1. The intermediate image pixels r(x,y,t) ($0 \leq x \leq N-1$, $0 \leq y \leq M-1$) whose distance from the source image plane is t ($0 \leq t \leq 1$) are obtained as follows. First, the location of the pixel r(x,y,t), where x,y,t $\in$ R, is determined by equation (42):

$$V(x, y) = (1 - dx)(1 - dy)(1 - t)i(i, j) + (1 - dx)(1 - dy)tf(i, j) + \quad (42)$$
$$dx(1 - dy)(1 - t)i(i + 1, j) + dx(1 - dy)tf(i + 1, j) +$$
$$(1 - dx)dy(1 - t)i(i, j + 1) + (1 - dx)dytf(i, j + 1) +$$
$$dxdy(1 - t)i(i + 1, j + 1) + dxdytf(i + 1, j + 1)$$

The value of the pixel intensity at r(x,y,t) is then determined by equation (43):

$$V(r(x, y, t)) = (1 - dx)(1 - dy)(1 - t)V(p_{(i,j)}) + \quad (43)$$
$$(1 - dx)(1 - dy)tV(q_{f(i,j)}) +$$
$$dx(1 - dy)(1 - t)V(p_{(i+1,j)}) +$$
$$dx(1 - dy)tV(q_{f(i+1,j)}) +$$
$$(1 - dx)dy(1 - t)V(p_{(i,j+1)}) +$$
$$(1 - dx)dytV(q_{f(i,j+1)}) +$$
$$dxdy(1 - t)V(p_{(i+1,j+1)}) + dxdytV(q_{f(i+1,j+1)})$$

where dx and dy are parameters varying from 0 to 1.

[1.9] Mapping to Which Constraints are Imposed

So far, the determination of a mapping in which no constraints are imposed has been described. However, if a correspondence between particular pixels of the source and destination images is provided in a predetermined manner, the mapping can be determined using such correspondence as a constraint.

The basic idea is that the source image is roughly deformed by an approximate mapping which maps the specified pixels of the source image to the specified pixels of the destination image and thereafter a mapping f is accurately computed.

First, the specified pixels of the source image are mapped to the specified pixels of the destination image, then the approximate mapping that maps other pixels of the source image to appropriate locations are determined. In other words, the mapping is such that pixels in the vicinity of a specified pixel are mapped to locations near the position to which the specified one is mapped. Here, the approximate mapping at the m-th level in the resolution hierarchy is denoted by $F^{(m)}$.

The approximate mapping F is determined in the following manner. First, the mappings for several pixels are specified. When $n_s$ pixels $$p(i_0, j_0), p(i_1, j_1), \ldots, p(i_{n_s-1}, j_{n_s-1}) \quad (44)$$

of the source image are specified, the following values in the equation (45) are determined.

$$F^{(n)}(i_0, j_0) = (k_0, l_0), \quad (45)$$
$$F^{(n)}(i_1, j_1) = (k_1, l_1), \ldots,$$
$$F^{(n)}(i_{n_s-1}, j_{n_s-1}) = (k_{n_s-1}, l_{n_s-1})$$

For the remaining pixels of the source image, the amount of displacement is the weighted average of the displacement of $p(i_h, j_h)$ (h=0, ..., $n_s$−1). Namely, a pixel $p_{(i,j)}$ is mapped to the following pixel (expressed by the equation (46)) of the destination image.

$$F^{(m)}(i, j) = \frac{(i, j) + \sum_{h=0}^{h=n_s-1}(k_h - i_h, l_h - j_h)weight_h(i, j)}{2^{n-m}} \quad (46)$$

where $$weight_h(i, j) = \frac{1/\|(i_h - i, j_h - j)\|^2}{total\_weight(i, j)} \quad (47)$$

where $$total\_weight(i, j) = \sum_{h=0}^{h=n_s-1} 1/\|(i_h - i, j_h - j)\|^2 \quad (48)$$

Second, the energy $D_{(i,j)}^{(m,s)}$ of the candidate mapping f is changed so that a mapping f similar to $F^{(m)}$ has a lower energy. Precisely speaking, $D_{(i,j)}^{(m,s)}$ is expressed by the equation (49):

$$D_{(i,j)}^{(m,s)} = E_{0(i,j)}^{(m,s)} + \eta E_{1(i,j)}^{(m,s)} + \kappa E_{2(i,j)}^{(m,s)} \quad (49)$$

where $$E_{2(i,j)}^{(m,s)} = \quad (50)$$
$$\begin{cases} 0, & \text{if} \|F^{(m)}(i, j) - f^{(m,s)}(i, j)\|^2 \leq \left\lfloor \frac{\rho^2}{2^{2(n-m)}} \right\rfloor \\ \|F^{(m)}(i, j) - f^{(m,s)}(i, j)\|^2, & \text{otherwise} \end{cases}$$

where $\kappa, \rho \geq 0$. Finally, the resulting mapping f is determined by the above-described automatic computing process.

Note that $E_{2(i,j)}^{(m,s)}$ becomes 0 if $f^{(m,s)}(i,j)$ is sufficiently close to $F^{(m)}(i,j)$ i.e., the distance therebetween is equal to or less than $$\left\lfloor \frac{\rho^2}{2^{2(n-m)}} \right\rfloor \quad (51)$$

This has been defined in this way because it is desirable to determine each value $f^{(m,s)}(i,j)$ automatically to fit in an appropriate place in the destination image as long as each value $f^{(m,s)}(i,j)$ is close to $F^{(m)}(i,j)$. For this reason, there is no need to specify the precise correspondence in detail to have the source image automatically mapped so that the source image matches the destination image.

[2] Concrete Processing Procedure

The flow of a process utilizing the respective elemental techniques described in [1] will now be described.

Figure 6:
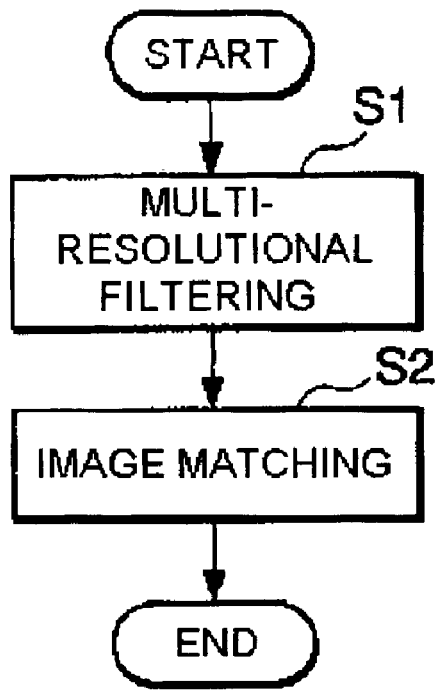
FIG. 6 is a flowchart of the entire procedure of a preferred embodiment in the base technology.

FIG. 6 is a flowchart of the overall procedure of the base technology. Referring to FIG. 6, a source image and destination image are first processed using a multiresolutional critical point filter (S1). The source image and the destination image are then matched (S2). As will be understood, the matching (S2) is not required in every case, and other processing such as image recognition may be performed instead, based on the characteristics of the source image obtained at S1.

Figure 7:
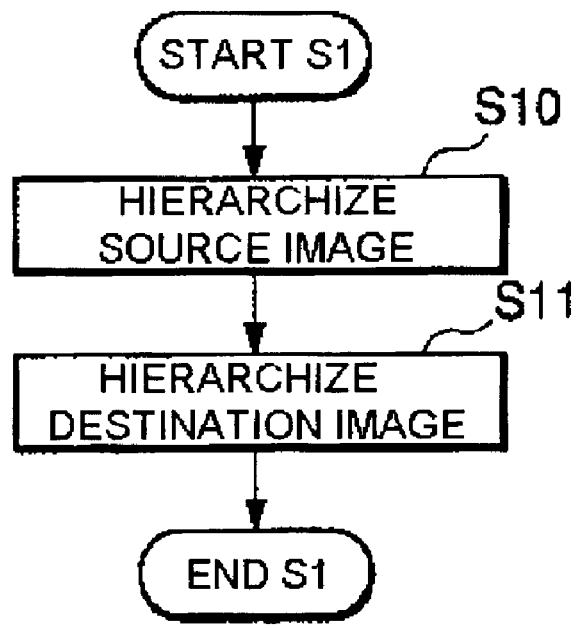
FIG. 7 is a flowchart showing the details of the process at S1 in FIG. 6.

FIG. 7 is a flowchart showing details of the process S1 shown in FIG. 6. This process is performed on the assumption that a source image and a destination image are matched at S2. Thus, a source image is first hierarchized using a critical point filter (S10) so as to obtain a series of source hierarchical images. Then, a destination image is hierarchized in the similar manner (S11) so as to obtain a series of destination hierarchical images. The order of S10 and S11 in the flow is arbitrary, and the source image and the destination image can be generated in parallel. It may also be possible to process a number of source and destination images as required by subsequent-processes.

Figure 8:
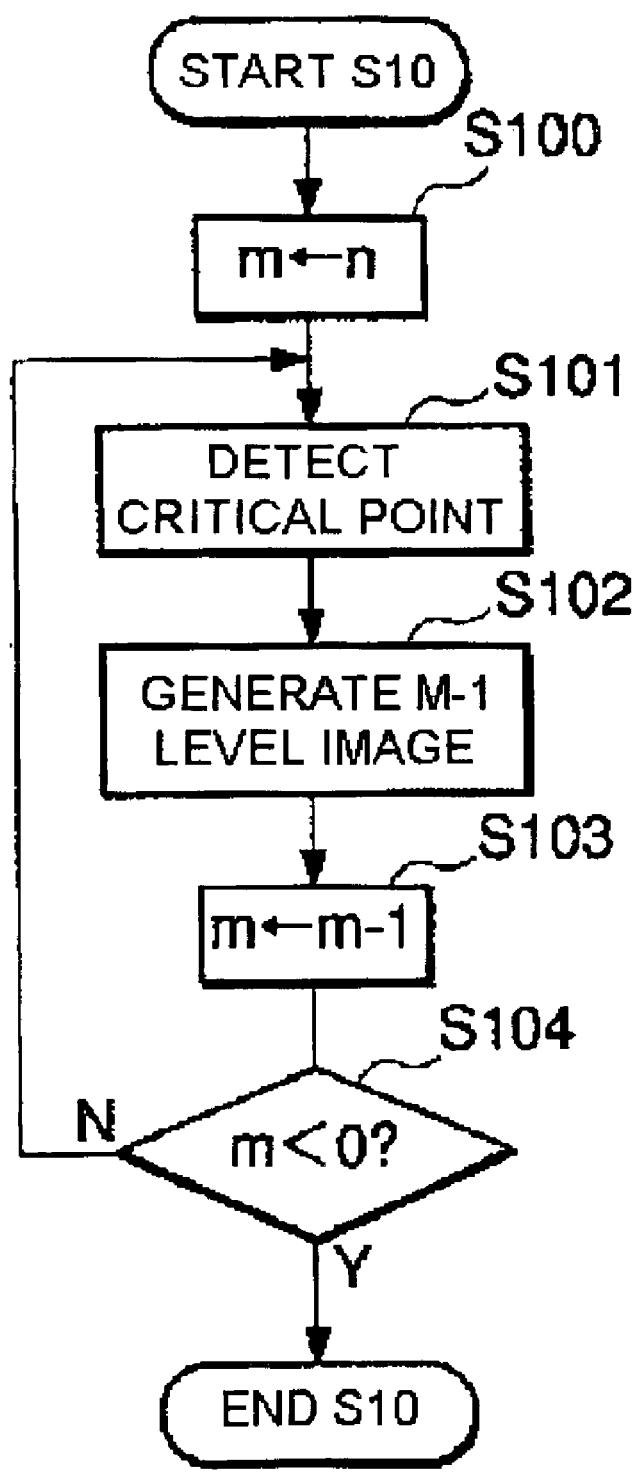
FIG. 8 is a flowchart showing the details of the process at S10 in FIG. 7.

FIG. 8 is a flowchart showing details of the process at S10 shown in FIG. 7. Suppose that the size of the original source image is $2^n \times 2^n$. Since source hierarchical images are sequentially generated from an image with a finer resolution to one with a coarser resolution, the parameter m which indicates the level of resolution to be processed is set to n (S100). Then, critical points are detected from the images $p^{(m,0)}$, $p^{(m,1)}$, $p^{(m,2)}$ and $p^{(m,3)}$ of the m-th level of resolution, using a critical point filter (S101), so that the images $p^{(m-1,0)}$, $p^{(m-1,1)}$, $p^{(m-1,2)}$ and $p^{(m-1,3)}$ of the (m-1)th level are generated (S102). Since m=n here, $p^{(m,0)} = p^{(m,1)} = p^{(m,2)} = p^{(m,3)} = p^{(n)}$ holds and four types of subimages are thus generated from a single source image.

Figure 9:
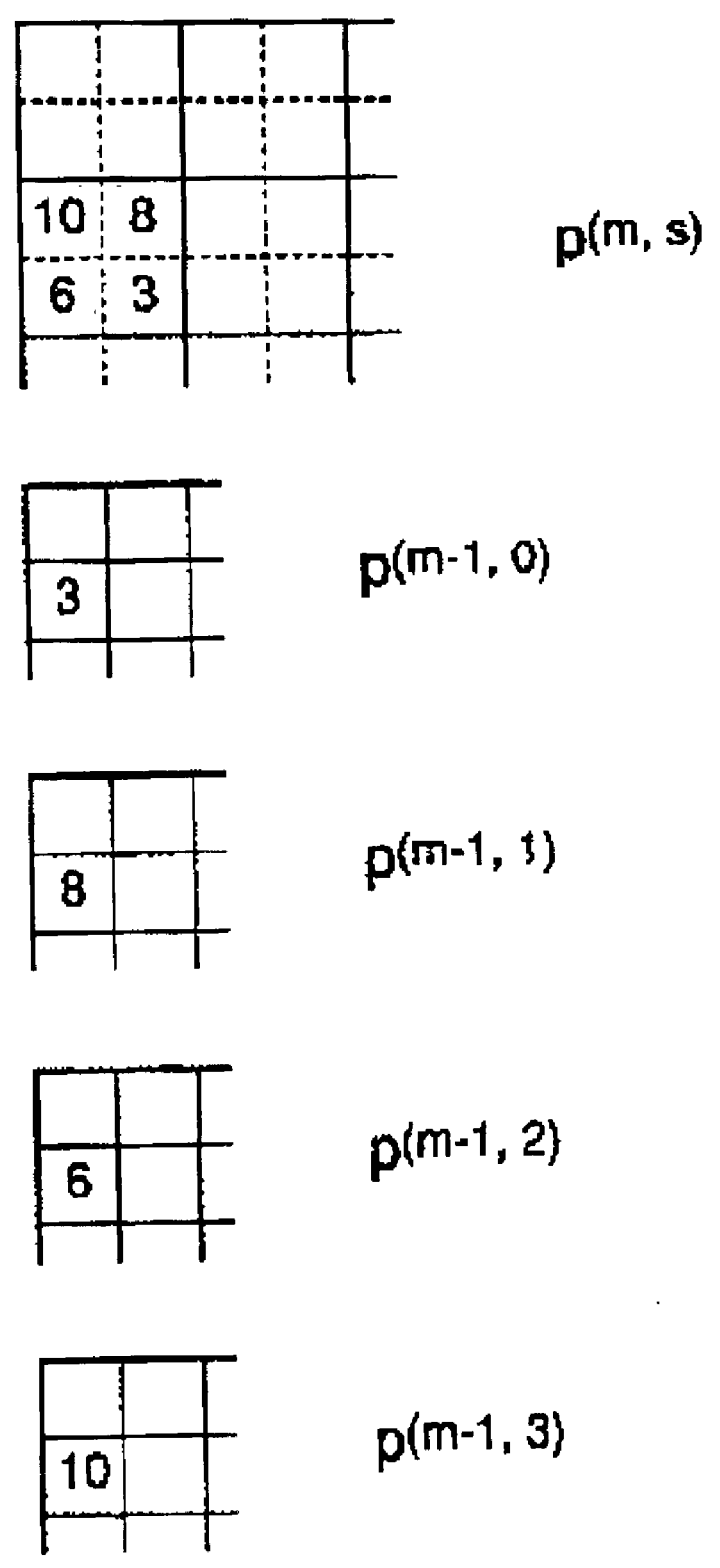

FIG. 9 shows correspondence between partial images of the m-th and those of (m-1)th levels of resolution. Referring to FIG. 9, respective numberic values shown in the figure represent the intensity of respective pixels. $p^{(m,s)}$ symbolizes any one of four images $p^{(m,0)}$ through $p^{(m,3)}$, and when generating $p^{(m-1,0)}$, $p^{(m,0)}$ is used from $p^{(m,s)}$. For example, as for the block shown in FIG. 9, comprising four pixels with their pixel intensity values indicated inside, images $p^{(m-1,0)}$, $p^{(m-1,1)}$, $p^{(m-1,2)}$ and $p^{(m-1,3)}$ acquire "3", "8", "6" and "10", respectively, according to the rules described in [1.2]. This block at the m-th level is replaced at the (m-1)th level by respective single pixels thus acquired. Therefore, the size of the subimages at the (m-1)th level is $2^{m-1} \times 2^{m-1}$.

After m is decremented (S103 in FIG. 8), it is ensured that m is not negative (S104). Thereafter, the process returns to S101, so that subimages of the next level of resolution, i.e., a next coarser level, are generated. The above process is repeated until subimages at m=0 (0-th level) are generated to complete the process at S10. The size of the subimages at the 0-th level is 1×1.

Figure 10:
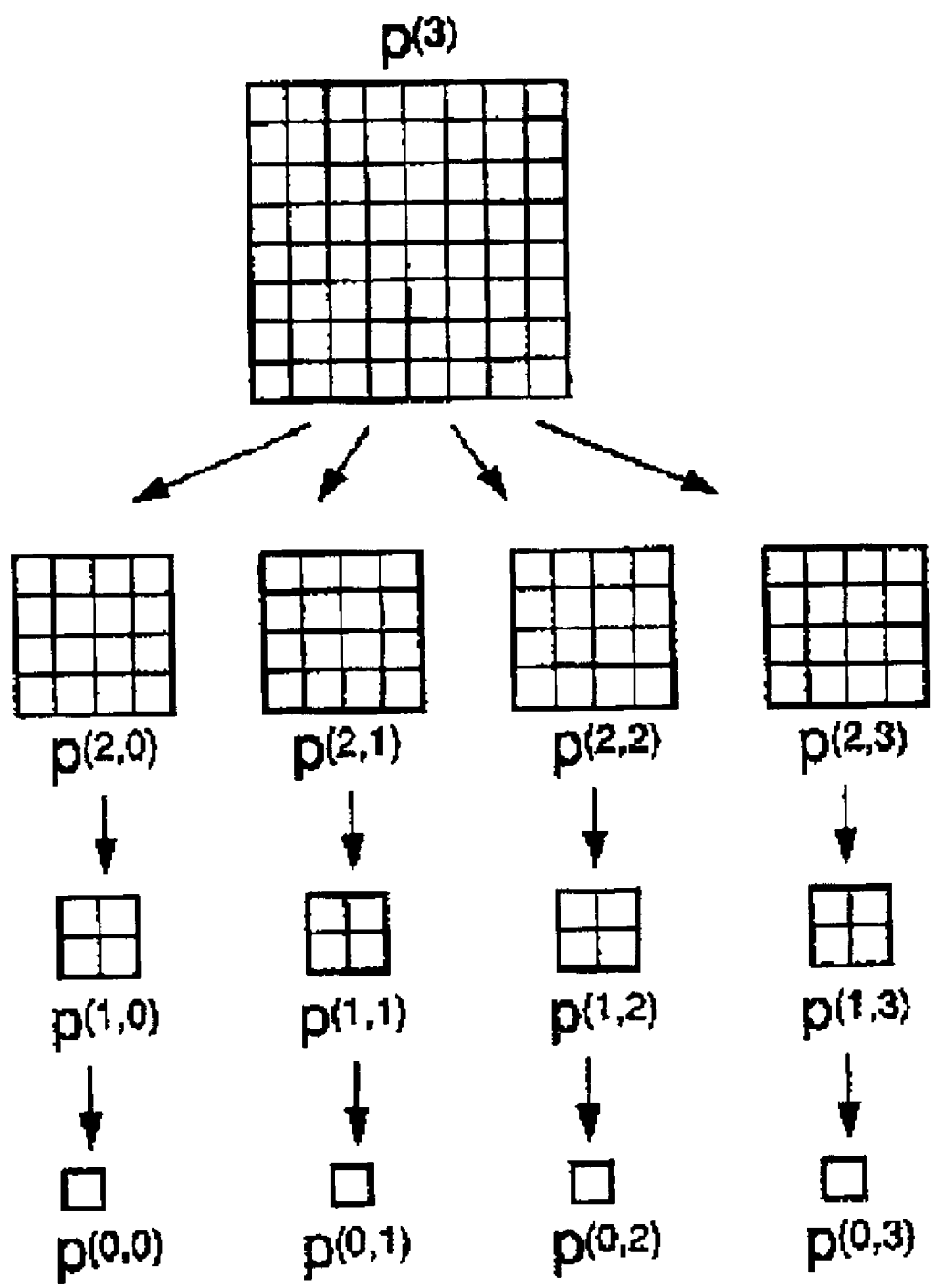
FIG. 10 is a diagram showing source images generated in the embodiment in the base technology.

FIG. 10 shows source hierarchical images generated at S10 in the case of n=3. The initial source image is the only image common to the four series followed. The four types of subimages are generated independently, depending on the type of critical point. Note that the process in FIG. 8 is common to S11 shown in FIG. 7, and that destination hierarchical images are generated through a similar procedure. Then, the process at S1 in FIG. 6 is completed.

Figure 11:
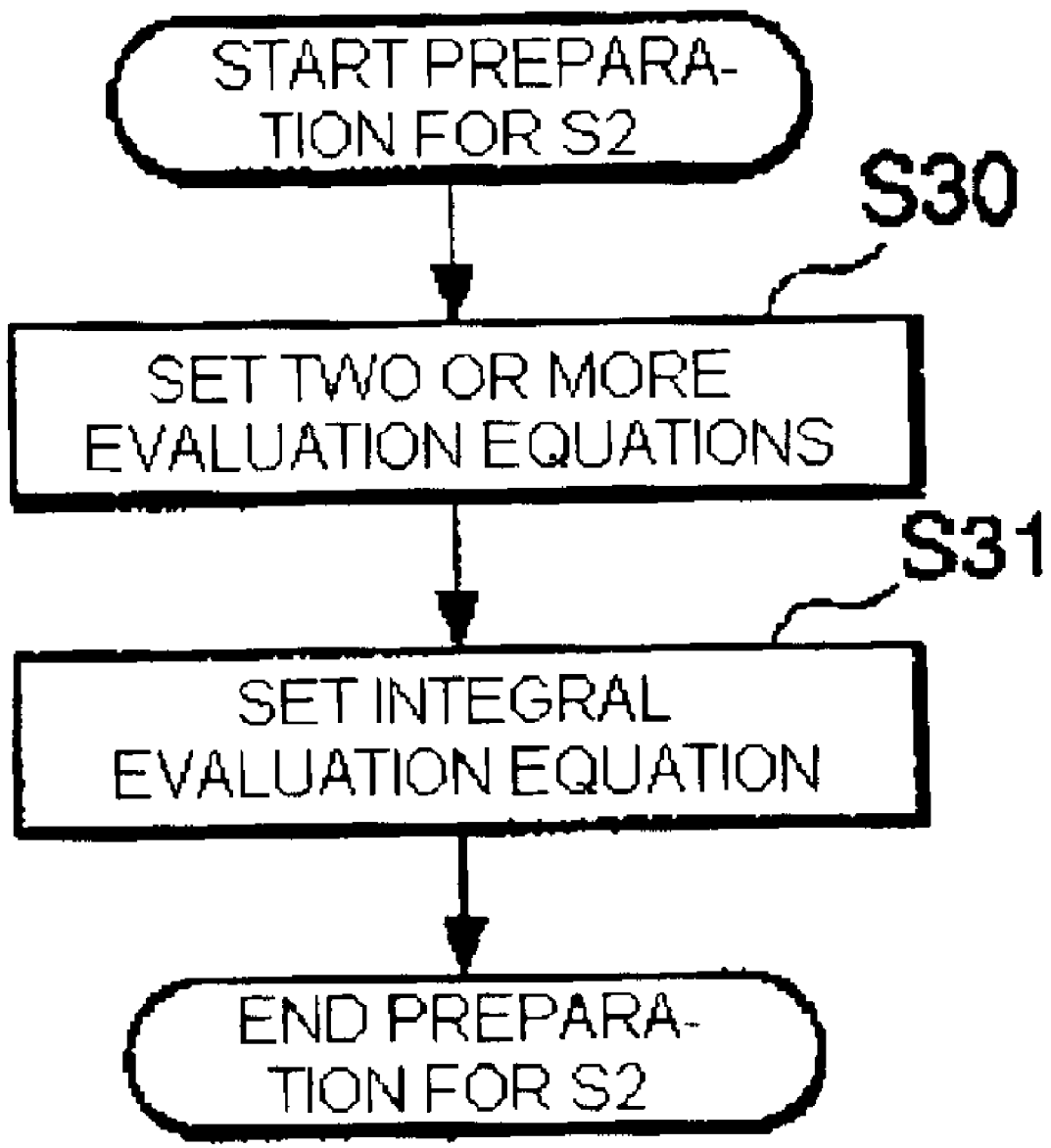
FIG. 11 is a flowchart of a preparation procedure for S2 in FIG. 6.

In this base technology, in order to proceed to S2 shown in FIG. 6 a matching evaluation is prepared. FIG. 11 shows the preparation procedure. Referring to FIG. 11, a plurality of evaluation equations are set (S30). The evaluation equations may include the energy $C_f^{(m,s)}$ concerning a pixel value, introduced in [1.3.2.1], and the energy $D_f^{(m,s)}$ concerning the smoothness of the mapping introduced in [1.3.2.2]. Next, by combining these evaluation equations, a combined evaluation equation is set (S31). Such a combined evaluation equation may be $\lambda C_{(i,j)}^{(m,s)} + D_f^{(m,s)}$. Using η introduced in [1.3.2.2], we have $$\Sigma\Sigma(\lambda C_{(i,j)}^{(m,s)} + \eta E_{0(i,j)}^{(m,s)} + E_{1(i,j)}^{(m,s)}) \quad (52)$$

In the equation (52) the sum is taken for each i and j where i and j run through $0, 1, \ldots, 2^{m-1}$. Now, the preparation for matching evaluation is completed.

Figure 12:
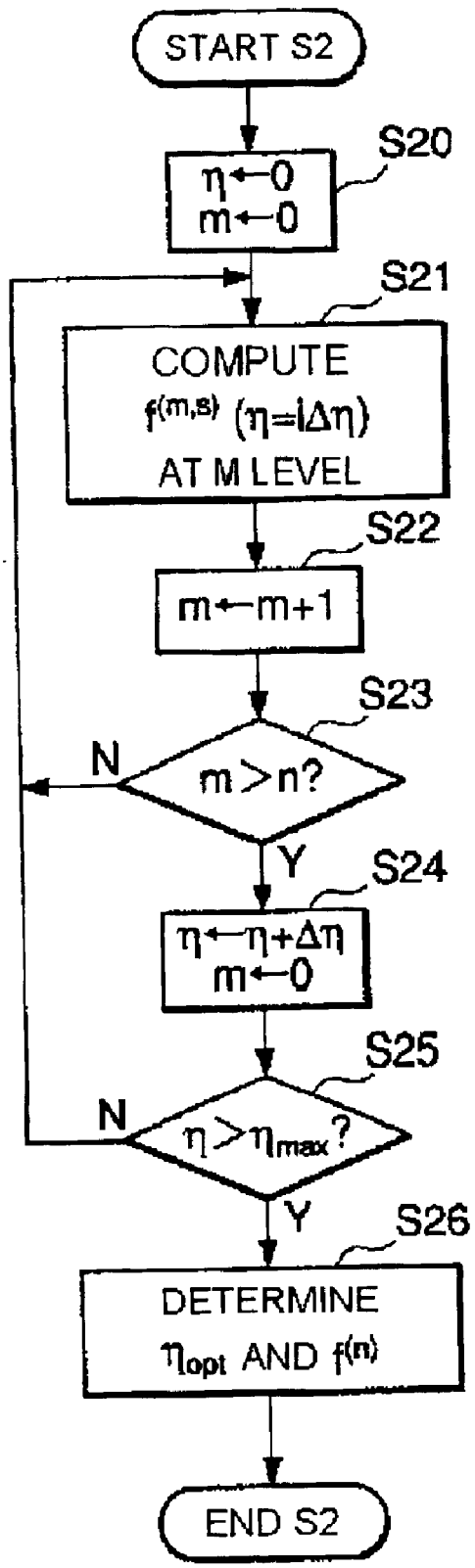
FIG. 12 is a flowchart showing the details of the process at S2 in FIG. 6.

FIG. 12 is a flowchart showing the details of the process of S2 shown in FIG. 6. As described in [1], the source hierarchical images and destination hierarchical images are matched between images having the same level of resolution. In order to detect global correspondence correctly, a matching is calculated in sequence from a coarse level to a fine level of resolution. Since the source and destination hierarchical images are generated using the critical point filter, the location and intensity of critical points are stored clearly even at a coarse level. Thus, the result of the global matching is superior to conventional methods.

Referring to FIG. 12, a coefficient parameter η and a level parameter m are set to 0 (S20). Then, a matching is computed between the four subimages at the m-th level of the source hierarchical images and those of the destination hierarchical images at the m-th level, so that four types of submappings $f^{(m,s)}$ (s=0, 1, 2, 3) which satisfy the BC and minimize the energy are obtained (S21). The BC is checked by using the inherited quadrilateral described in [1.3.3]. In that case, the submappings at the m-th level are constrained by those at the (m-1)th level, as indicated by the equations (17) and (18). Thus, the matching computed at a coarser level of resolution is used in subsequent calculation of a matching. This is called a vertical reference between different levels. If m=0, there is no coarser level and this exceptional case will be described using FIG. 13.

A horizontal reference within the same level is also performed. As indicated by the equation (20) in [1.3.3], $f^{(m,3)}$, $f^{(m,2)}$ and $f^{(m,1)}$ are respectively determined so as to be analogous to $f^{(m,2)}$, $f^{(m,1)}$ and $f^{(m,0)}$. This is because a situation in which the submappings are totally different seems unnatural even though the type of critical points differs so long as the critical points are originally included in the same source and destination images. As can been seen from the equation (20), the closer the submappings are to each other, the smaller the energy becomes, so that the matching is then considered more satisfactory.

As for $f^{(m,0)}$ which is to be initially determined, a coarser level by one may be referred to since there is no other submapping at the same level to be referred to as shown in the equation (19). In this base technology, however, a procedure is adopted such that after the submappings were obtained up to $f^{(m,3)}$, $f^{(m,0)}$ is recalculated once utilizing the thus obtained submappings as a constraint. This procedure is equivalent to a process in which s=4 is substituted into the equation (20) and $f^{(m,4)}$ is set to $f^{(m,0)}$ anew. The above process is employed to avoid the tendency in which the degree of association between $f^{(m,0)}$ and $f^{(m,3)}$ becomes too low. This scheme actually produced a preferable result. In addition to this scheme, the submappings are shuffled in the experiment as described in [1.7.1], so as to closely maintain the degrees of association among submappings which are originally determined independently for each type of critical point. Furthermore, in order to prevent the tendency of being dependent on the starting point in the process, the location thereof is changed according to the value of s as described in [1.7].

Figure 13:
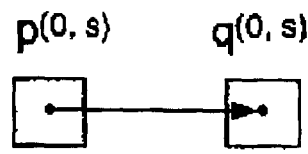
FIG. 13 is a diagram showing the way a submapping is determined at the 0-th level.
Figure 14:
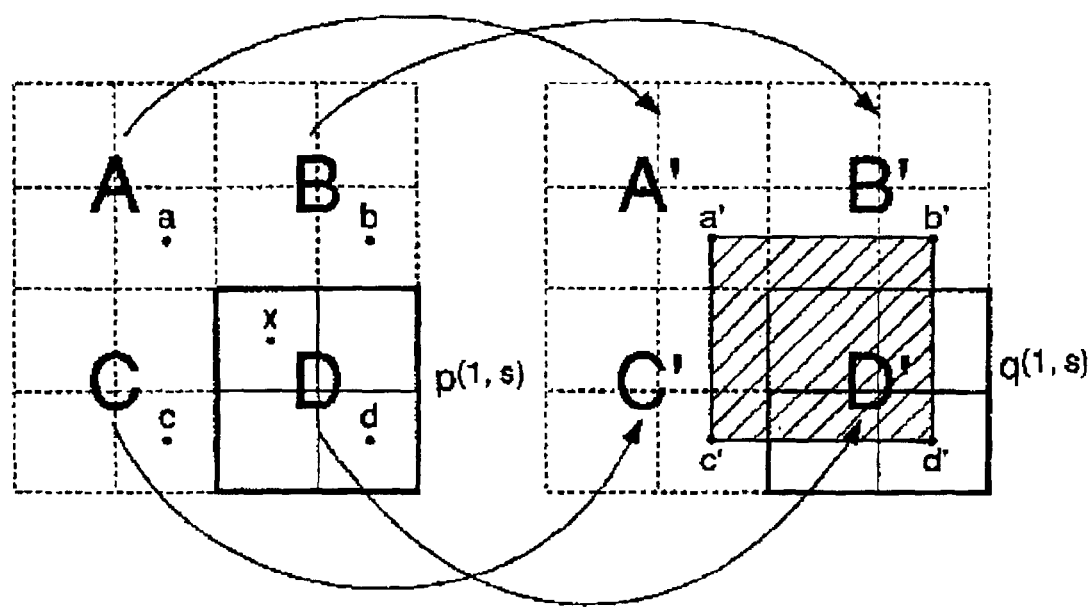
FIG. 14 is a diagram showing the way a submapping is determined at the first level.

FIG. 13 illustrates how the submapping is determined at the 0-th level. Since at the 0-th level each sub-image is consitituted by a single pixel, the four submappings $f^{(0,s)}$ are automatically chosen as the identity mapping. FIG. 14 shows how the submappings are determined at the first level. At the first level, each of the sub-images is constituted of four pixels, which are indicated by solid lines. When a corresponding point (pixel) of the point (pixel) x in $p^{(1,s)}$ is searched within $q^{(1,s)}$, the following procedure is adopted:

1. An upper left point a, an upper right point b, a lower left point c and a lower right point d with respect to the point x are obtained at the first level of resolution.
2. Pixels to which the points a to d belong at a coarser level by one, i.e., the 0-th level, are searched. In FIG. 14, the points a to d belong to the pixels A to D, respectively. However, the pixels A to C are virtual pixels which do not exist in reality.

3. The corresponding points A' to D' of the pixels A to D, which have already been defined at the 0-th level, are plotted in $q^{(1,s)}$. The pixels A' to C' are virtual pixels and regarded to be located at the same positions as the pixels A to C.
4. The corresponding point a' to the point a in the pixel A is regarded as being located inside the pixel A', and the point a' is plotted. Then, it is assumed that the position occupied by the point a in the pixel A (in this case, positioned at the lower right) is the same as the position occupied by the point a' in the pixel A'.
5. The corresponding points b' to d' are plotted by using the same method as the above 4 so as to produce an inherited quadrilateral defined by the points a' to d'.
6. The corresponding point x' of the point x is searched such that the energy becomes minimum in the inherited quadrilateral. Candidate corresponding points x' may be limited to the pixels, for instance, whose centers are included in the inherited quadrilateral. In the case shown in FIG. 14, the four pixels all become candidates.

The above described is a procedure for determining the corresponding point of a given point x. The same processing is performed on all other points so as to determine the submappings. As the inherited quadrilateral is expected to become deformed at the upper levels (higher than the second level), the pixels A' to D' will be positioned apart from one another as shown in FIG. 3.

Once the four submappings at the m-th level are determined in this manner, m is incremented (S22 in FIG. 12). Then, when it is confirmed that m does not exceed n (S23), return to S21. Thereafter, every time the process returns to S21, submappings at a finer level of resolution are obtained until the process finally returns to S21 at which time the mapping $f^{(n)}$ at the n-th level is determined. This mapping is denoted as $f^{(n)}$ ($\eta=0$) because it has been determined relative to $\eta=0$.

Next, to obtain the mapping with respect to other different $\eta$, $\eta$ is shifted by $\Delta\eta$ and m is reset to zero (S24). After confirming that new $\eta$ does not exceed a predetermined search-stop value $\eta_{max}$(S25), the process returns to S21 and the mapping $f^{(n)}(\eta=\Delta\eta)$ relative to the new $\eta$ is obtained. This process is repeated while obtaining $f^{(n)}(\eta=i\Delta\eta)$ (i=0, 1, ...) at S21. When $\eta$ exceeds $\eta_{max}$, the process proceeds to S26 and the optimal $\eta=\eta_{opt}$ is determined using a method described later, so as to let $f^{(n)}(\eta=\eta_{opt})$ be the final mapping $f^{(n)}$.

Figure 15:
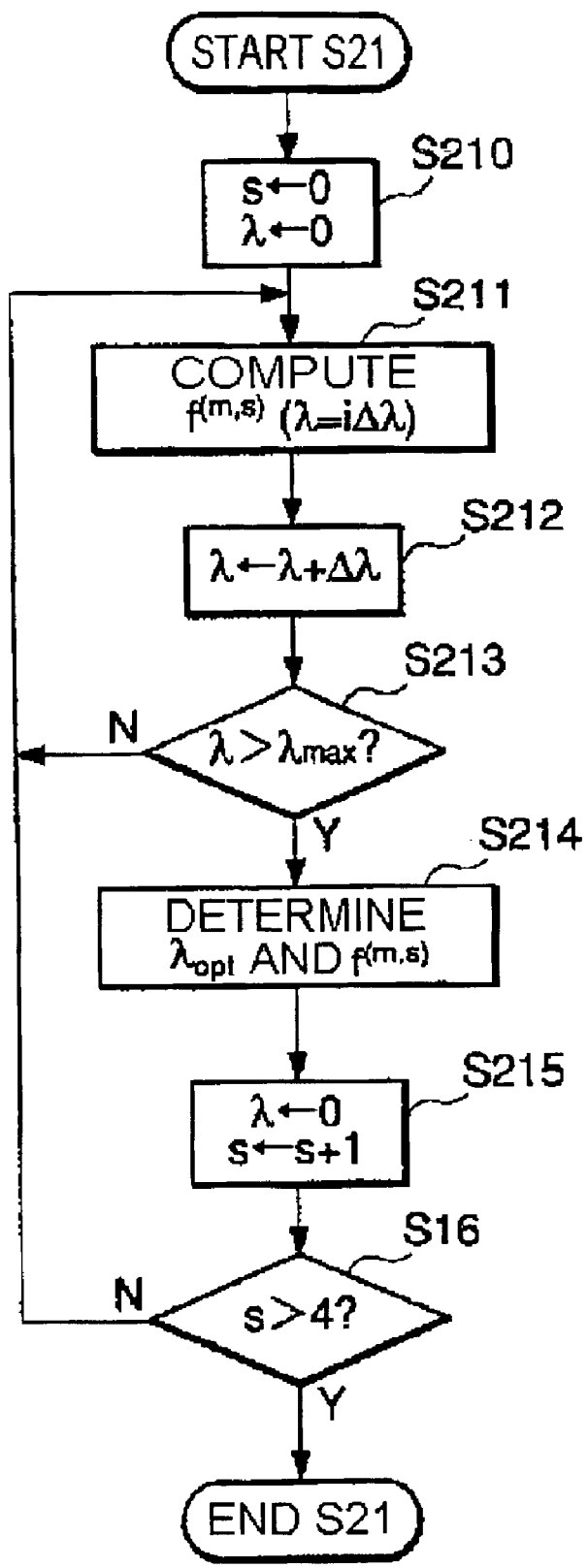
FIG. 15 is a flowchart showing the details of the process at S21 in FIG. 6.

FIG. 15 is a flowchart showing the details of the process of S21 shown in FIG. 12. According to this flowchart, the submappings at the m-th level are determined for a certain predetermined $\eta$. In this base technology, when determining the mappings, the optimal $\lambda$ is defined independently for each submapping.

Referring to FIG. 15, s and $\lambda$ are first reset to zero (S210). Then, obtained is the submapping $f^{(m,s)}$ that minimizes the energy with respect to the then $\lambda$ (and, implicitly, $\eta$) (S211), and the thus obtained submapping is denoted as $f^{(m,s)}$ ($\lambda=0$). In order to obtain the mapping with respect to other different $\lambda$, $\lambda$ is shifted by $\Delta\lambda$. After confirming that the new $\lambda$ does not exceed a predetermined search-stop value $\lambda_{max}$ (S213), the process returns to S211 and the mapping $f^{(m,s)}(\lambda=\Delta\lambda)$ relative to the new $\lambda$ is obtained. This process is repeated while obtaining $f^{(m,s)}(\lambda=i\Delta\lambda)$ (i=0, 1, ...). When $\lambda$ exceeds $\lambda_{max}$, the process proceeds to S214 and the optimal $\lambda=\lambda_{opt}$ is determined, so as to let $f^{(n)}(\lambda=\lambda_{opt})$ be the final mapping $f^{(m,s)}$(S214).

Next, in order to obtain other submappings at the same level, $\lambda$ is reset to zero and s is incremented (S215). After confirming that s does not exceed 4 (S216), return to S211. When s=4, $f^{(m,0)}$ is renewed utilizing $f^{(m,3)}$ as described above and a submapping at that level is determined.

Figure 16:
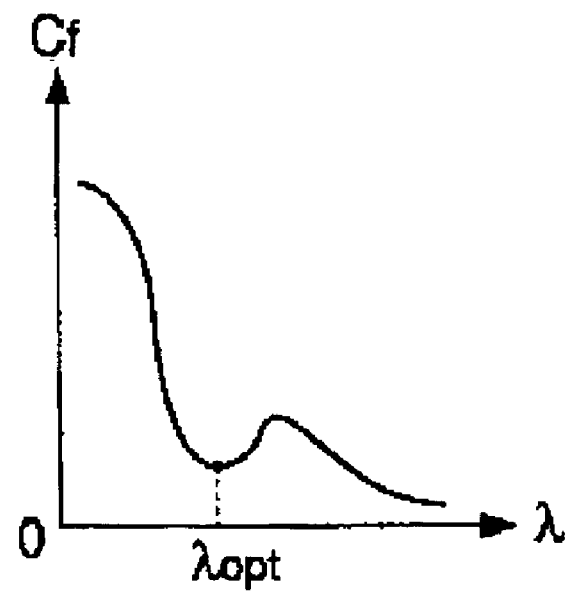
FIG. 16 is a graph showing the behavior of energy $C_f^{(m,s)}$ corresponding to $f^{(m,s)}$ ($\lambda=i\Delta\lambda$) which has been obtained for a certain $f^{(m,s)}$ while changing $\lambda$.

FIG. 16 shows the behavior of the energy $C_f^{(m,s)}$ corresponding to $f^{(m,s)}(\lambda=i\Delta\lambda)$ (i=0, 1, ...) for a certain m and s while varying $\lambda$. As described in [1.4], as $\lambda$ increases, $C_f^{(m,s)}$ normally decreases but changes to increase after $\lambda$ exceeds the optimal value. In this base technology, $\lambda$ in which $C_f^{(m,s)}$ becomes the minima is defined as $\lambda_{opt}$. As observed in FIG. 16, even if $C_f^{(m,s)}$ begins to decrease again in the range $\lambda>\lambda_{opt}$, the mapping will not be as good. For this reason, it suffices to pay attention to the first occurring minima value. In this base technology, $\lambda_{opt}$ is independently determined for each submapping including $f^{(n)}$.

Figure 17:
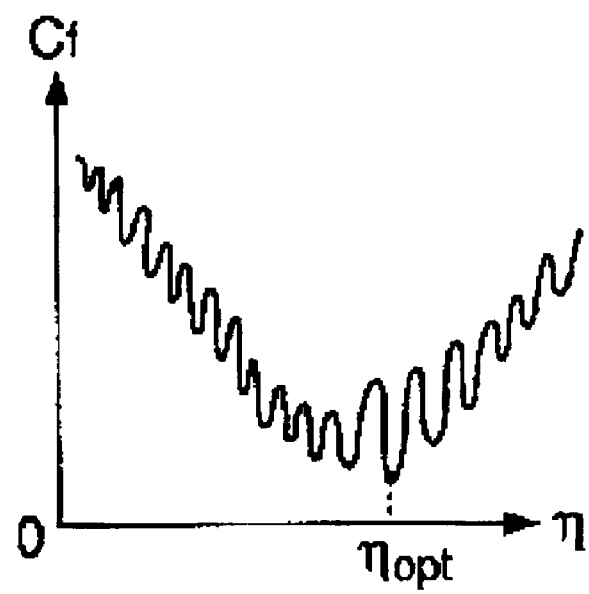
FIG. 17 is a diagram showing the behavior of energy $C_f^{(n)}$ corresponding to $f^{(n)}$ ($\eta=i\Delta\eta$) (i=0, 1, ... ) which has been obtained while changing η.

FIG. 17 shows the behavior of the energy $C_f^{(n)}$ corresponding to $f^{(n)}$ ($\eta=i\Delta\eta$) (i=0, 1, ...) while varying $\eta$. Here too, $C_f^{(n)}$ normally decreases as $\eta$ increases, but $C_f^{(n)}$ changes to increase after $\eta$ exceeds the optimal value. Thus, $\eta$ in which $C_f^{(n)}$ becomes the minima is defined as $\eta_{opt}$. FIG. 17 can be considered as an enlarged graph around zero along the horizontal axis shown in FIG. 4. Once $\eta_{opt}$ is determined, $f^{(n)}$ can be finally determined.

As described above, this base technology provides various merits. First, since there is no need to detect edges, problems in connection with the conventional techniques of the edge detection type are solved. Furthermore, prior knowledge about objects included in an image is not necessitated, thus automatic detection of corresponding points is achieved. Using the critical point filter, it is possible to preserve intensity and locations of critical points even at a coarse level of resolution, thus being extremely advantageous when applied to object recognition, characteristic extraction, and image matching. As a result, it is possible to construct an image processing system which significantly reduces manual labor.

Some further extensions to or modifications of the above-described base technology may be made as follows:

(1) Parameters are automatically determined when the matching is computed between the source and destination hierarchical images in the base technology. This method can be applied not only to the calculation of the matching between the hierarchical images but also to computing the matching between two images in general.

For instance, an energy $E_0$ relative to a difference in the intensity of pixels and an energy $E_1$ relative to a positional displacement of pixels between two images may be used as evaluation equations, and a linear sum of these equations, i.e., $E_{tot}=\alpha E_0+E_1$, may be used as a combined evaluation equation. While paying attention to the neighborhood of the extrema in this combined evaluation equation, $\alpha$ is automatically determined. Namely, mappings which minimize $E_{tot}$ are obtained for various $\alpha$'s. Among such mappings, $\alpha$ at which $E_{tot}$ takes the minimum value is defined as an optimal parameter. The mapping corresponding to this parameter is finally regarded as the optimal mapping between the two images.

Many other methods are available in the course of setting up evaluation equations. For instance, a term which becomes larger as the evaluation result becomes more favorable, such as $1/E_1$ and $1/E_2$, may be employed. A combined evaluation equation is not necessarily a linear sum, but an n-powered sum (n=2, ½, −1, −2, etc.), a polynomial or an arbitrary function may be employed when appropriate.

The system may employ a single parameter such as the above $\alpha$, two parameters such as $\eta$ and $\lambda$ as in the base technology, or more than two parameters. When there are more than three parameters used, they may be determined while changing one at a time.

(2) In the base technology, a parameter is determined in a two-step process. That is, in such a manner that a point at which $C_f^{(m,s)}$ takes the minima is detected after a mapping such that the value of the combined evaluation equation becomes minimum is determined. However, instead of this two-step processing, a parameter may be effectively determined, as the case may be, in a manner such that the minimum value of a combined evaluation equation becomes minimum. In this case, $\alpha E_0 + \beta E_1$, for example, may be used as the combined evaluation equation, where $\alpha + \beta = 1$ may be imposed as a constraint so as to equally treat each evaluation equation. The automatic determination of a parameter is effective when determining the parameter such that the energy becomes minimum.

(3) In the base technology, four types of submappings related to four types of critical points are generated at each level of resolution. However, one, two, or three types among the four types may be selectively used. For instance, if there exists only one bright point in an image, generation of hierarchical images based solely on $f^{(m,3)}$ related to a maxima point can be effective to a certain degree. In this case, no other submapping is necessary at the same level, thus the amount of computation relative on s is effectively reduced.

(4) In the base technology, as the level of resolution of an image advances by one through a critical point filter, the number of pixels becomes ¼. However, it is possible to suppose that one block consists of 3×3 pixels and critical points are searched in this 3×3 block, then the number of pixels will be ⅑ as the level advances by one.

(5) In the base technology, if the source and the destination images are color images, they would generally first be converted to monochrome images, and the mappings then computed. The source color images may then be transformed by using the mappings thus obtained. However, as an alternate method, the submappings may be computed regarding each RGB component.

Preferred Embodiments Concerning Image Effects
Image Coding and Decoding Techniques The base technology describes a method in which matching between key frames is used to determine correspondence information (or corresponding points or pixels) between key frames (stored in a corresponding point file or correspondence information file), which can then be used to generate intermediate frames between the key frames. Since any original intermediate frames in a motion picture may be removed and later replaced by generated intermediate frames this technique is applicable to compression of motion pictures. Actual experiments conducted using this technique have given results indicating both higher image quality and higher compression rate when compared with MPEG techniques. In the following description, a coding technique and a decoding technique which make use of the base technology will be described. In particular, the coding and decoding techniques provide for also reproducing sound accompanying the reproduction of motion pictures.

Coder

Figure 18:
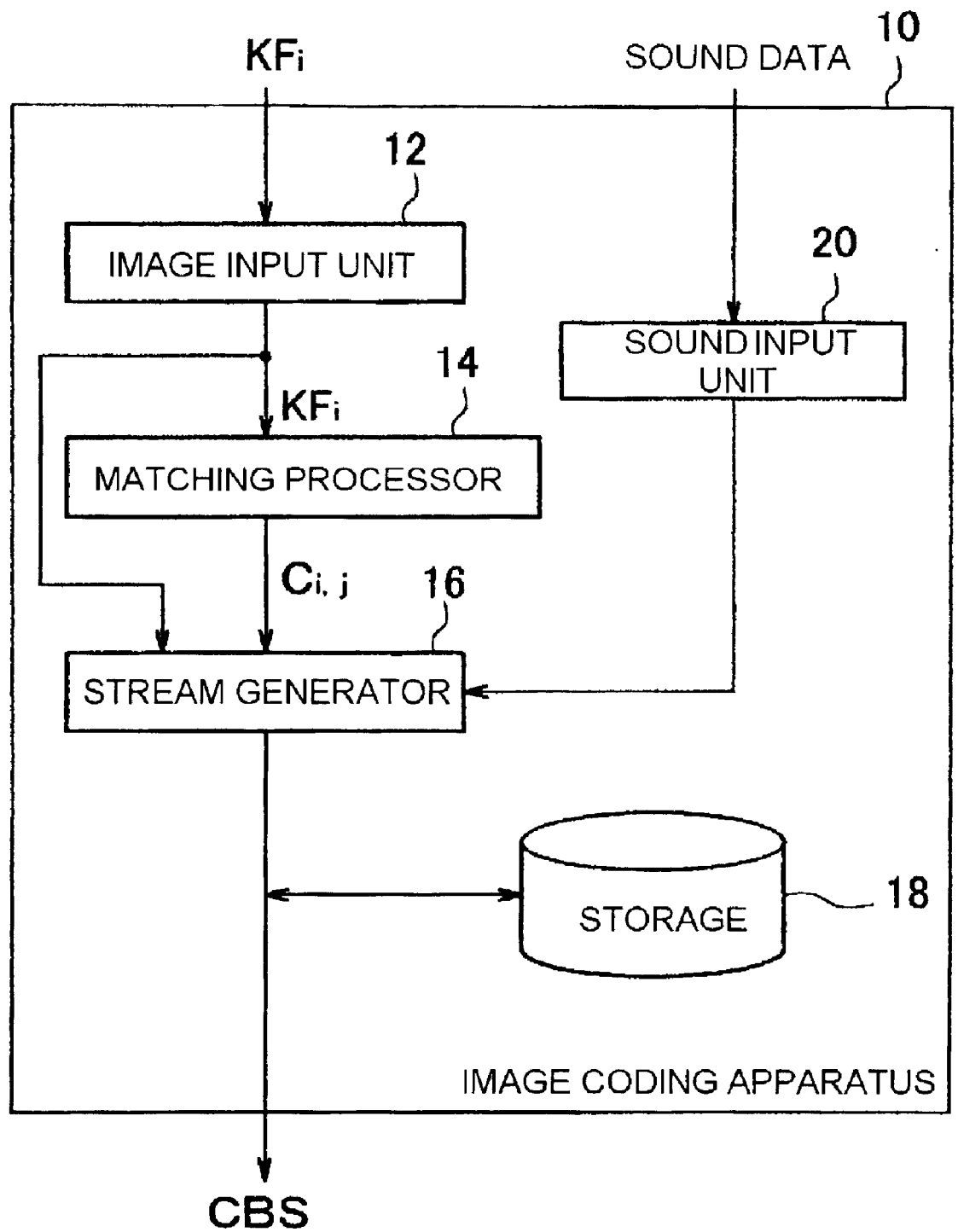
FIG. 18 shows an image coding apparatus according to an embodiment of the invention.

FIG. 18 shows a structure of an image coding apparatus 10 according to an embodiment of the invention. The apparatus 10 includes an image input unit 12 which receives or acquires or determines key frames $KF_i$, for example, from a motion picture, a matching processor 14 which generates correspondence information files $C_{i,j}$ by a matching computation between key frames, a sound input unit 20 which receives, acquires or detects sound data accompanying the motion picture, and a stream generator 16 which generates a coded data stream CBS (Coded Bit Stream) (simply referred to as a data stream hereinafter) incorporating the key frames, the correspondence information (correspondence information files $C_{i,j}$), and the sound data. In this embodiment, the sound data are also stored in the correspondence information files $C_{i,j}$, however, the sound data may also be included at other appropriate places within the data stream CBS. The data stream CBS may be stored in a storage unit 18 as necessary.

The image input unit 12 may either receive already existing key frames, or may take or capture images itself, similar to a digital camera or the like. It will be understood that the image input unit 12 may also perform the function of selecting key frames $KF_1$ from a stream of image frames such as those in a motion picture using an appropriate algorithm. For example, the key frames $KF_i$ may be defined by extracting image frames included in a motion picture at intervals of 0.5 seconds or the like.

Similarly the sound input unit 20 may also input sound data which already exists or may capture sound data itself, for example through a microphone or the like.

As particular examples, the image coding apparatus 10 may be realized by a computer such as a PC (Personal Computer), by an image and sound recording apparatus such as a digital VCR, or by any appropriate device depending on the application.

As indicated above, the matching processor 14 performs a matching computation between key frames to determine the correspondence information. For example, the matching computation may include a pixel-by-pixel matching using critical points or the like based on the base technology above or may include other matching technologies. It is useful to note that the image coding apparatus 10 may also be arranged so that it does not include the matching processor 14. In this case, the correspondence information will be input from other units or devices (not shown) instead of being generated by the matching processor 14.

Figure 19:
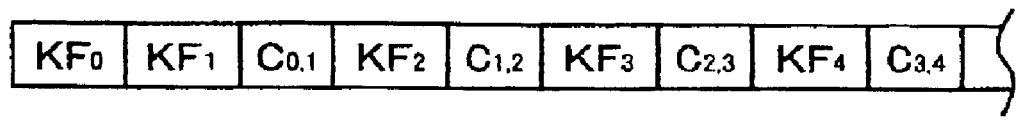
FIG. 19 shows a structure of a data stream generated in a stream generator.

FIG. 19 shows a structure of the data stream CBS generated by the stream generator 16. In this example, this stream comprises, in sequence, $KF_0$, $KF_1$, $C_{0,1}$, $KF_2$, $C_{1,2}$, $KF_3$, $C_{2,3}$, . . .

Figure 20:
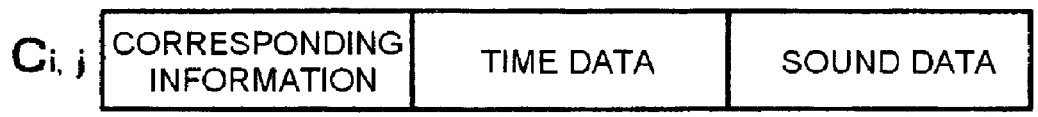
FIG. 20 shows a structure of a correspondence information file generated by a matching processor.

FIG. 20 shows a format of the correspondence information file ($C_{i,j}$) for the embodiments. First, the correspondence information between the key frames is described, for example, for each pixel in the key frames. Secondly, following the corresponding information, time instruction or time data to reproduce or to display key frames $KF_i$ and $KF_j$ are described. When the key frames are selected at regular intervals, the time data are not necessary. When the intervals are not fixed, the time data are required. The time data may be, for example, the elapsed time from the starting frame $KF_0$ or from the previous frame or the like. Moreover, the time data may also be provided apart from the key frame data, such that the time data may be provided gathered at the head of the data stream CBS.

Thirdly, following the time data, the sound data are provided. In this case, the sound data are included according to the time interval between the key frames of $KF_i$ and $KF_j$. For example, when the interval is just one second, the sound data for just one second will be stored in the correspondence information file $C_{i,j}$. In the discussion below, the time interval is assumed to be one second.

In this embodiment, the timing of the starting point of each portion of the sound data and the timing of the key frames $KF_i$ are synchronized. The motion pictures and the sound can thus be synchronized during reproduction. In this embodiment, since there are no intermediate frames at the beginning, the data to synchronize the sound data and the motion pictures are related only to the key frames. For simplicity, the sound data are incorporated in the correspondence information file so that the output timing of the sound data synchronizes with the display timing of the leading key frame in each pair of key frames which are used to generate the intermediate frames, however, the sound data may also be included in other positions within the data stream CBS.

As a particular example, when the sampling frequency is 44.1 kHz (that is, equivalent to that of a CD (Compact Disk)) and the format of the sound data is 16 bits, the correspondence information file $C_{i,j}$ will include sound data of 44100× 16 bits, namely a little less than 90 kB, for the amount of sound data for one second. The sound data may also be compressed by various techniques. In one case, for example, the amount of sound data will be one tenth, namely about 10 kB, when the sound data is music and is compressed by MP3.

Decoder

Figure 21:
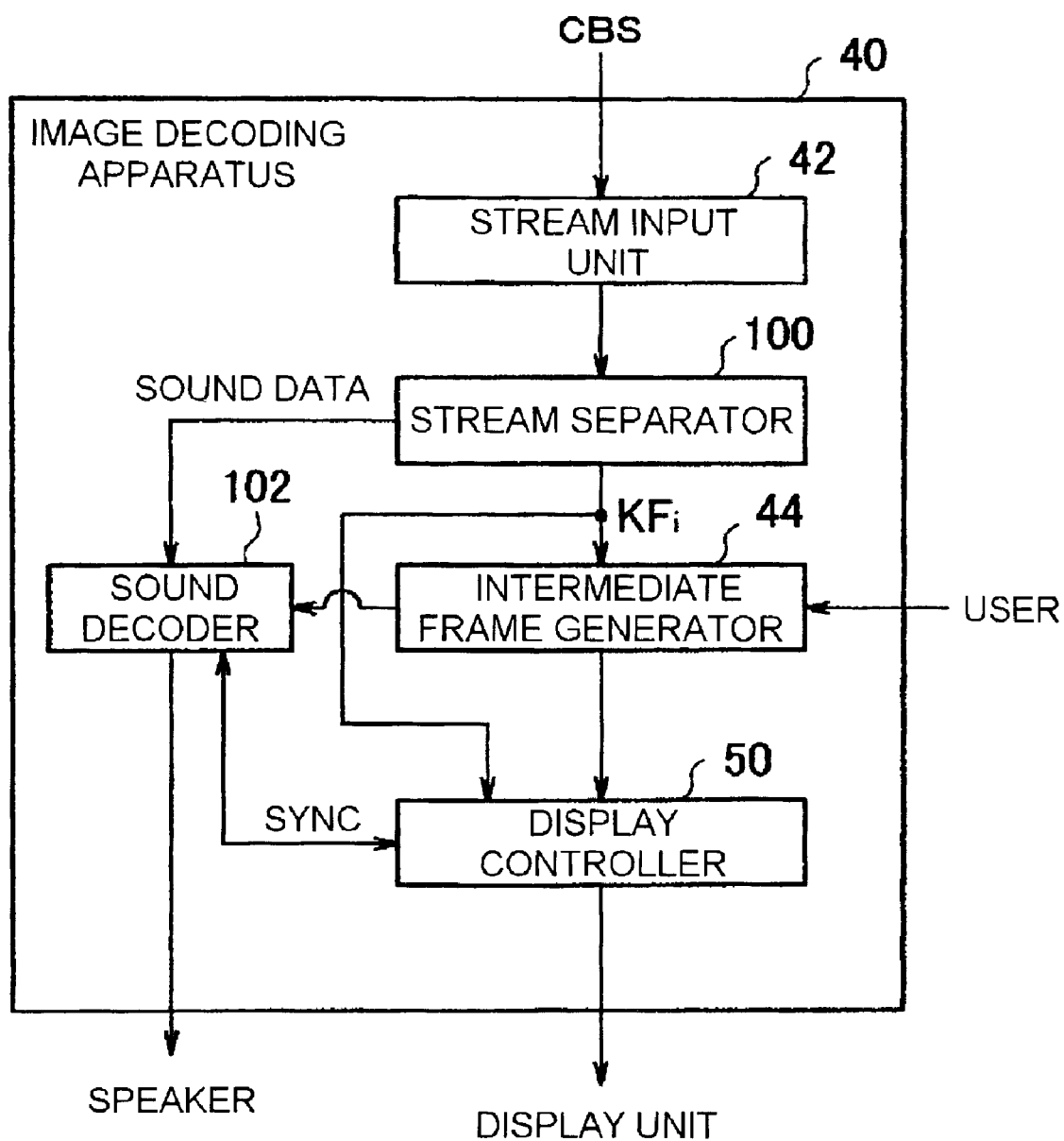
FIG. 21 shows an image decoding apparatus according to an embodiment of the invention.

FIG. 21 shows an image decoding apparatus 40. The apparatus 40 includes a stream input unit 42 which receives or acquires a data stream CBS, a stream separator 100 which separates the stream into key frames $KF_I$ and correspondence information files and separates the sound data from the correspondence information files, an intermediate frame generator 44 which generates intermediate frames from the key frames and the correspondence data in the correspondence information file, a sound decoder 102 which decodes the sound from the sound data and outputs the sound to a speaker or the like, and a display controller 50 which processes the key frames and the intermediate frames to be displayed as a motion picture. The data generated in the display controller 50 are output to a display unit or the like such that a motion picture is reproduced from the data stream CBS. AS shown in FIG. 21, the display controller 50 and the sound decoder 102 are linked so that control timings can be synchronized such that the frame and sound output are synchronized.

Figure 22:
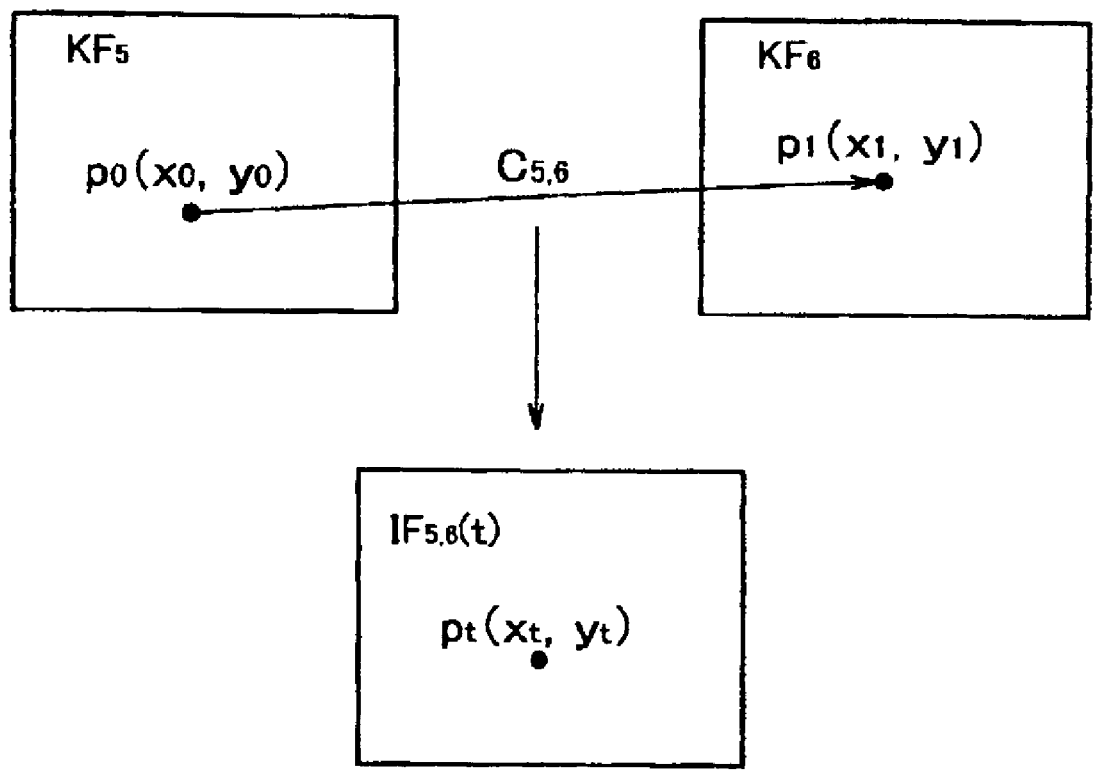
FIG. 22 illustrates a theory for generating an intermediate frame using an intermediate frame generator of the image decoding apparatus of FIG. 21.

FIG. 22 illustrates the principle of generating an intermediate frame using the intermediate frame generator 44. This process is also described in the base technology section above. Initially, the intermediate-frame generator 44 receives two key frames $KF_5$ and $KF_6$ and a correspondence information file $C_{5,6}$ therefor. This correspondence information file $C_{5,6}$ (also sometimes called a corresponding point file) specifies how points, such as the point $p_0(x_0, y_0)$, in the key frame $KF_5$ correspond to points, such as the point $p_1(x_1, y_1)$, in the key frame $KF_6$. Here, a point is specified by its coordinate $(x_1, y_i)$ and a value of a pixel $p_1$, although many other attributes or parameters may also be used. In generating an intermediate frame, points in the intermediate frame $IF_{5,6}(t)$, such as point $p_t(x_t, y_t)$, are determined by interpolation of the coordinates and interpolation of the values of the pixels along a time axis.

As shown in FIG. 21, in this embodiment, the intermediate frame generator 44 may receive an instruction from a user in order to set the speed of reproduction or play back of the motion picture. This instruction may relate to the number of intermediate frames to be generated or may relate to speed, such as "Faster replay" or "Slower replay", instead of the number of intermediate frames. Depending on the selection of key frames $KF_i$ and the speed at which the display controller 50 operates to display frames, there will be a predetermined number of intermediate frames between each pair of key frames to allow reproduction at "normal" or "default" speed. If "slower" is selected, the number of intermediate frames can be increased. If "faster" is selected, the number can be decreased. For example, by increasing the number of intermediate frames and displaying them at regular intervals of time, slow motion images and super slow motion images can be displayed.

If the number of intermediate frames changes, the synchronized output of sound will be disturbed. In order to compensate, the intermediate frame generator 44 can compute an interval between key frames, for example, from the number of intermediate frames, and send this result to the sound decoding unit 102. The sound decoding unit 102 can then follow the result and change the output frequency from, for example, 44.1 kHz to another frequency to resynchronize with the frames being displayed. For example, if the sum of the numbers of intermediate frames and key frames is double of the "normal" or "default" value, the output frequency can be changed to 22.05 kHz.

Although the present invention has been described by way of exemplary embodiments, it should be understood that many changes and substitutions may be made by those skilled in the art without departing from the scope of the present invention which is defined only by the appended claims.

Further aspects of the present invention are described in the following references:

11. An image coding apparatus comprising a matching processor for multiresolutionalizing respective key frames by extracting critical points, specifying a relation between the critical points in sequence starting from a coarse level of resolution, and generating correspondence information using the specified relation.

12. An image coding apparatus comprising a matching processor for computing matching between key frames using a multiresolutional critical point filter, and generating corresponding point information using the computed matching.

22. A computer program executable by a computer, the program comprising the functions of: acquiring key frames included in a motion picture and corresponding point data between the key frames; acquiring sound data to be reproduced in synchronization with a reproduction of the motion picture; and generating a coded data stream which includes the sound data, the corresponding point data and the key frames.

23. A computer program executable by a computer, the program comprising the functions of: acquiring a coded data stream; acquiring key frames, corresponding point data, and sound data from the coded data stream; reproducing a motion picture based on the acquired key frames and corresponding point data, and outputting the sound data synchronized to the motion picture.

What is claimed is:

1. An image decoding method comprising:

acquiring a coded data stream comprising key frames, corresponding point data for the key frames, and sound data related to the key frames;

separating the key frames, corresponding point data, and sound data from the coded data stream;

reproducing a motion picture based on the key frames and the corresponding point data by outputting the key frames and intermediate frames generated by interpolation of the key frames using the corresponding point data; and outputting the sound data based on the number of intermediate frames synchronously with the motion picture.

2. An image decoding method according to claim 1, wherein the corresponding point data are acquired based on critical points of the key frames.

3. An image decoding method according to claim 1, wherein the corresponding point data are described by the correspondence of pixels between key frames.

4. An image decoding apparatus comprising:

a first function block for acquiring a coded data stream of a motion picture;

a second function block for acquiring key frames, corresponding point data between key frames, and sound data from the coded data stream;

a third function block for generating intermediate frames based on the key frames and the corresponding point data;

a fourth function block for outputting the key frames and the intermediate frames as a motion picture; and a fifth function block for outputting the sound data at an output timing based on the number of intermediate frames to provide synchronization with the motion picture.

5. An image decoding apparatus according to claim 4, wherein the corresponding point data are acquired based on critical points of the key frames.

6. An image decoding apparatus according to claim 4, wherein the corresponding point data are represented by corresponding pixels between the key frames.

7. An image decoding apparatus according to claim 4, wherein the third function block is also for receiving an instruction regarding the number of intermediate frames to be generated from an external source.

8. An image decoding apparatus according to claim 4, wherein the corresponding point data and the sound data are stored collectively as a correspondence information file and wherein the second function block acquires the corresponding point data and the sound data from the correspondence information file.

9. An image decoding method comprising:

acquiring a coded data stream comprising key frames, corresponding point data for the key frames, and sound data;

separating the key frames, corresponding point data, and sound data from the coded data stream;

generating a predetermined number of intermediate frames between key frames based on the key frames and the corresponding point data;

outputting the key frames and intermediate frames to a display device at a predetermined rate;

outputting the sound data to a speaker based on the number of intermediate frames such that said sound data is output synchronously with the output frames.

10. An image decoding method according to claim 9, wherein the generating of intermediate frames is by interpolation of the key frames using the corresponding point data.

11. An image decoding method according to claim 9, wherein the predetermined number of intermediate frames generated is set by user input.

12. An image decoding method according to claim 11, wherein user input comprises a user selection of one of play, fast forward or slow motion.

13. An image decoding method according to claim 9, wherein the outputting the sound data based on the number of intermediate frames comprises varying the frequency of the sound data based on the number of intermediate frames.

14. An image decoding method according to claim 9, wherein the predetermined rate is between approximately 1 and 120 frames per second.

* * * * *